US010817693B1

(12) United States Patent
Bassani et al.

(10) Patent No.: US 10,817,693 B1
(45) Date of Patent: Oct. 27, 2020

(54) SYSTEM FOR DECODE OF TWO-DIMENSIONAL INDICIA

(71) Applicants: Marco Bassani, Bologna (IT); Marco Viti, Casalecchio di Reno (IT)

(72) Inventors: Marco Bassani, Bologna (IT); Marco Viti, Casalecchio di Reno (IT)

(73) Assignee: Datalogic IP Tech S.R.L., Bologna (IT)

(*) Notice: Subject to any disclaimer, the term of this patent is extended or adjusted under 35 U.S.C. 154(b) by 0 days.

(21) Appl. No.: 16/507,149

(22) Filed: Jul. 10, 2019

(51) Int. Cl.
*G06K 7/14* (2006.01)
*G06K 7/10* (2006.01)

(52) U.S. Cl.
CPC ......... *G06K 7/1456* (2013.01); *G06K 7/1093* (2013.01); *G06K 7/1417* (2013.01); *G06K 7/1443* (2013.01)

(58) Field of Classification Search
CPC .................................. G06K 7/14; G06K 7/10
USPC ...................................................... 235/462.1
See application file for complete search history.

(56) References Cited

U.S. PATENT DOCUMENTS 6,047,893 A 4/2000 Saporetti
7,780,084 B2 8/2010 Zhang et al.
9,092,301 B2 7/2015 Blumfield et al.
2004/0020989 A1* 2/2004 Muramatsu ...... G06K 19/06037 235/462.1
2006/0049260 A1* 3/2006 Takahashi ........ G06K 19/06037 235/454
2009/0200379 A1* 8/2009 Kuyper-Hammond ...................... G06K 19/06028 235/462.1
2010/0084470 A1 4/2010 Scott et al.
2010/0301115 A1* 12/2010 Berkun ................. G09B 5/062 235/380

* cited by examiner

*Primary Examiner* — Michael G Lee
*Assistant Examiner* — David Tardif
(74) *Attorney, Agent, or Firm* — The Juhasz Law Firm

(57) ABSTRACT

An apparatus includes a programmable logic configured to: convolve a stencil in a non-rotated orientation about a 2D array of pixels of a captured image received as image data from a camera to generate non-rotated stencil data; generate rotated stencil data based on a rotation of the stencil into a rotated orientation; generate, based on the non-rotated and rotated stencil data, a per-pixel density map indicative of a location of a corner of a 2D indicia within the captured image; employ noise filtering and subsampling to generate, based on the per-pixel density map, a per-tile density map indicative of the location of the corner of the 2D indicia within a 2D array of tiles that corresponds to the 2D array of pixels of the captured image; and generate, based on the per-tile density map, 2D indicia metadata indicative of the location of the 2D indicia within the captured image.

20 Claims, 14 Drawing Sheets

1000

SYSTEM FOR DECODE OF TWO-DIMENSIONAL INDICIA

RELATED APPLICATIONS

This application is related to: U.S. Pat. No. 6,047,893 entitled "METHOD OF LOCATING AN OBJECT-APPLIED OPTICAL CODE" and issued Apr. 11, 2000 to Claudio Saporetti; U.S. patent application Ser. No. 15/686,614 entitled "CODED IMAGE CAPTURE AND DECODING SYSTEM" and filed Aug. 25, 2017; U.S. patent application Ser. No. 15/686,671 entitled "SIMD-BASED SYSTEM FOR MULTIPLE DECODE OF CAPTURED IMAGES" and filed Aug. 25, 2017; and U.S. patent application Ser. No. 16/056,053 entitled "SYSTEM FOR MULTIPLE DECODE OF CAPTURED IMAGES" and filed Aug. 6, 2018; each of which is hereby incorporated by reference in its entirety for all purposes.

BACKGROUND

1. Field

The present disclosure relates to systems for use in decoding encoded data markings applied to surfaces of objects.

2. Description of the Related Art

The application of encoded data markings that encode data, such as indicia, digital watermarks and/or human-readable text, to a surface of an object for subsequent capture and decoding to retrieve data encoded therein is well known. Also well known is the use of a camera to capture an image of such a surface in an effort to capture an image of one or more encoded data markings for decoding.

Such a camera may be a stationary camera positioned to cover a location at which an object bearing one or more of such encoded data markings may be placed and/or through which such an object may be transported. By way of example, such a camera may be positioned to place a doorway or portion of the interior of a warehouse within its field of view (FOV) to enable the capture of one or more encoded data markings carried on a surface of an object (e.g., a box, a crate, a palletized load, etc.) as the object is transported into the warehouse, is stored within the portion of the warehouse, and/or is transported out of the warehouse. By way of example, such a camera may be positioned along the path of a conveyor belt or other device along which such an object carrying such encoded data markings on a surface thereof may be moved.

As will be familiar to those skilled in the art, searching through a captured image to identify each such encoded data marking, and then interpreting each identified encoded data marking to decode the data encoded therein are typically processing-intensive tasks. Also, in situations in which multiple objects may be moved through the FOV (e.g., where the camera is positioned to cover a path through a doorway or the path of a conveyor belt), there may be a relatively small amount of time between instances of an object passing through the FOV, thereby providing only a relatively small amount of time during which each of the encoded data markings that may be carried on a surface of each object must be identified and decoded.

In particular, the processing demands of searching through a captured image to identify each location at which an encoded data marking that may be present are sufficiently great that the use of processors with multiple processing cores and/or specialized processing components among which to distribute and/or offload such work has been considered. Also, the use of multiple processors among which such work would be distributed has also been considered.

However, employing such complex processors and/or multiple processors typically adds considerable undesired expense and complexity to decoding devices, and/or typically undesirably increases the power consumption of decoding devices. Thus, a system able to more efficiently identify each location at which an encoded data marking may be present is needed.

SUMMARY

Technologies are described for making more efficient use of processing resources in identifying and interpreting two-dimensional indicia within an image of at least a portion of an object captured by a camera without the need to employ more complex processors and/or multiple processors.

An apparatus includes: a storage configured to store image data received from an image sensor of a camera of a captured image that is captured by the image sensor, wherein the captured image includes a two-dimensional (2D) array of pixels; and a programmable logic device coupled to the storage. The programmable logic device is configured to: convolve a 2D indicia stencil in a non-rotated orientation about the 2D array of pixels of the captured image to generate non-rotated stencil data; generate at least one rotated stencil data based on a rotation of the 2D indicia stencil out of the non-rotated orientation and into at least one rotated orientation; generate, based on the non-rotated stencil data and the at least one rotated stencil data, a per-pixel density map indicative of at least one location of at least one corner of at least one 2D indicia within the 2D array of pixels of the captured image; employ noise filtering and subsampling to generate, based on the per-pixel density map, a per-tile density map indicative of the at least one location of the at least one corner of the at least one 2D indicia within a 2D array of tiles that corresponds to the 2D array of pixels of the captured image; and generate, based on the per-tile density map, 2D indicia metadata indicative of the at least one location of the at least one 2D indicia within the captured image.

A decoding system includes: multiple cameras, wherein at least one camera of the multiple cameras includes an image sensor configured to capture an image, wherein the captured image includes a two-dimensional (2D) array of pixels; and a programmable logic device. The programmable logic device is configured, for each captured image of the multiple captured images, to: convolve a 2D indicia stencil in a non-rotated orientation about the 2D array of pixels of the captured image to generate non-rotated stencil data; generate at least one rotated stencil data based on a rotation of the 2D indicia stencil out of the non-rotated orientation and into at least one rotated orientation; generate, based on the non-rotated stencil data and the at least one rotated stencil data, a per-pixel density map indicative of at least one location of at least one corner of at least one 2D indicia within the 2D array of pixels of the captured image; employ noise filtering and subsampling to generate, based on the per-pixel density map, a per-tile density map indicative of the at least one location of the at least one corner of the at least one 2D indicia within a 2D array of tiles that corresponds to the 2D array of pixels of the captured image; and generate, based on the per-tile density map, 2D indicia metadata indicative of the at least one location of the at least one 2D indicia within the captured image.

A method includes: receiving, at a programmable logic device, image data from an image sensor of a camera of a captured image captured by the image sensor, wherein the captured image includes a two-dimensional (2D) array of pixels; convolving, by the programmable logic device, a 2D indicia stencil in a non-rotated orientation about the 2D array of pixels of the captured image to generate non-rotated stencil data; generating, by the programmable logic device, at least one rotated stencil data based on a rotation of the 2D indicia stencil out of the non-rotated orientation and into at least one rotated orientation; generating, at the programmable logic device, and based on the non-rotated stencil data and the at least one rotated stencil data, a per-pixel density map indicative of at least one location of at least one corner of at least one 2D indicia within the 2D array of pixels of the captured image; employing noise filtering and subsampling to generate, by the programmable logic device, and based on the per-pixel density map, a per-tile density map indicative of the at least one location of the at least one corner of the at least one 2D indicia within a 2D array of tiles that corresponds to the 2D array of pixels of the captured image; and generating, by the programmable logic device, and based on the per-tile density map, 2D indicia metadata indicative of the at least one location of the at least one 2D indicia within the captured image.

DETAILED DESCRIPTION

Figure 1A:
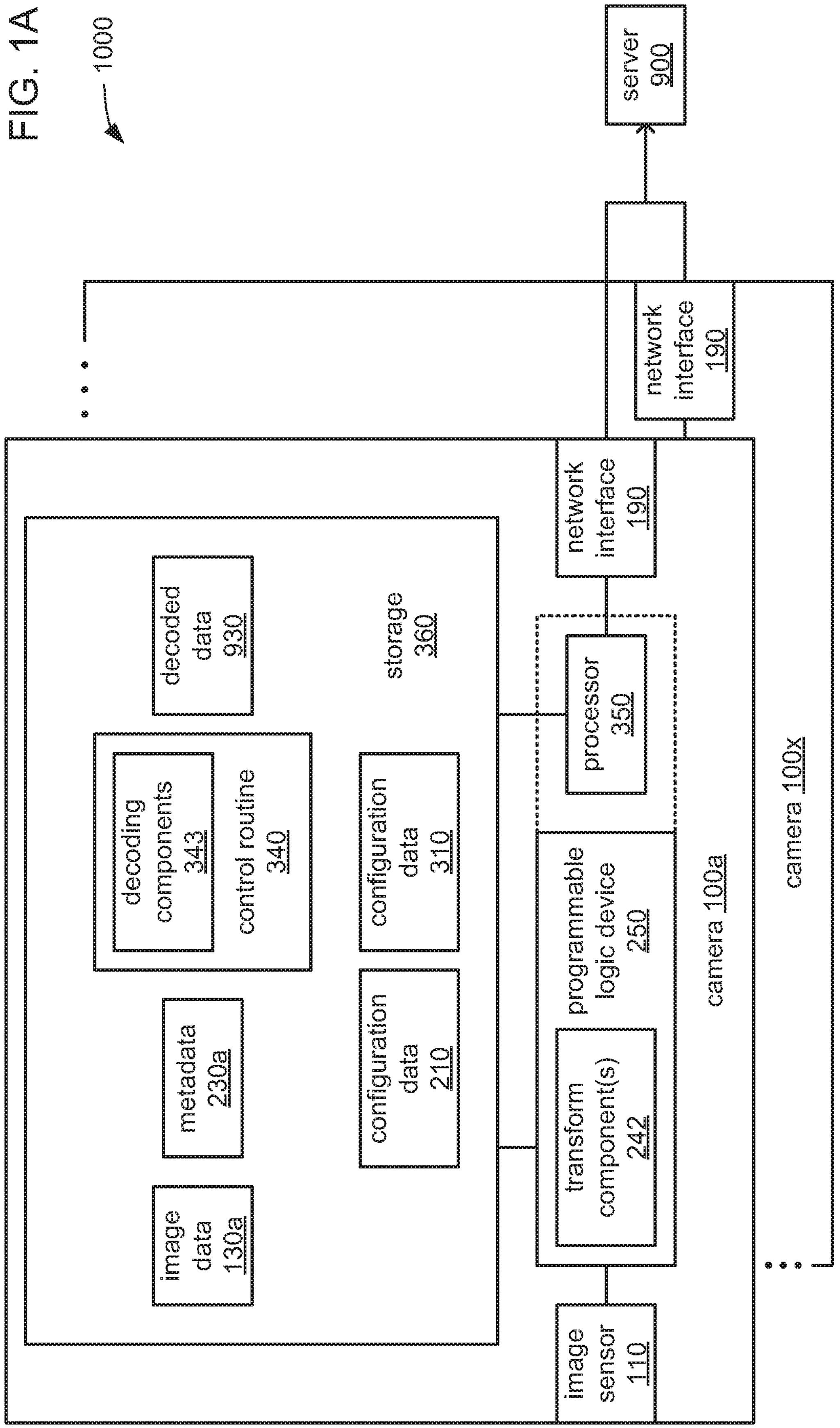
FIGS. 1A and 1B show aspects of alternate implementations of an indicia decoding system.

This detailed disclosure further incorporates by reference the disclosure provided in U.S. Pat. No. 6,047,893 entitled "METHOD OF LOCATING AN OBJECT-APPLIED OPTICAL CODE" and issued Apr. 11, 2000 to Claudio Saporetti; the disclosure provided in U.S. patent application Ser. No. 15/686,614 entitled "CODED IMAGE CAPTURE AND DECODING SYSTEM" and also filed Aug. 25, 2017; the disclosure provided in U.S. patent application Ser. No. 15/686,671 entitled "SIMD-BASED SYSTEM FOR MULTIPLE DECODE OF CAPTURED IMAGES" and filed Aug. 25, 2017; and the disclosure provided in U.S. patent application Ser. No. 16/056,053 entitled "SYSTEM FOR MULTIPLE DECODE OF CAPTURED IMAGES" and filed Aug. 6, 2018.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is a decoding system to identify and decode at least two-dimensional (2D) indicia that are included within an image of at least a portion of an object captured by a camera. However, various embodiments thereof may also decode one or more other types of encoded data marking that encode data, such as one-dimensional (1D) indicia, digital watermarks and/or human-readable text.

An apparatus includes: a storage configured to store image data received from an image sensor of a camera of a captured image that is captured by the image sensor, wherein the captured image includes a two-dimensional (2D) array of pixels; and a programmable logic device coupled to the storage. The programmable logic device is configured to: convolve a 2D indicia stencil in a non-rotated orientation about the 2D array of pixels of the captured image to generate non-rotated stencil data; generate at least one rotated stencil data based on a rotation of the 2D indicia stencil out of the non-rotated orientation and into at least one rotated orientation; generate, based on the non-rotated stencil data and the at least one rotated stencil data, a per-pixel density map indicative of at least one location of at least one corner of at least one 2D indicia within the 2D array of pixels of the captured image; employ noise filtering and subsampling to generate, based on the per-pixel density map, a per-tile density map indicative of the at least one location of the at least one corner of the at least one 2D indicia within a 2D array of tiles that corresponds to the 2D array of pixels of the captured image; and generate, based on the per-tile density map, 2D indicia metadata indicative of the at least one location of the at least one 2D indicia within the captured image.

A decoding system includes: multiple cameras, wherein at least one camera of the multiple cameras includes an image sensor configured to capture an image, wherein the captured image includes a two-dimensional (2D) array of pixels; and a programmable logic device. The programmable logic device is configured, for each captured image of the multiple captured images, to: convolve a 2D indicia stencil in a non-rotated orientation about the 2D array of pixels of the captured image to generate non-rotated stencil data; generate at least one rotated stencil data based on a rotation of the 2D indicia stencil out of the non-rotated orientation and into at least one rotated orientation; generate, based on the non-rotated stencil data and the at least one rotated stencil data, a per-pixel density map indicative of at least one location of at least one corner of at least one 2D indicia within the 2D array of pixels of the captured image; employ noise filtering and subsampling to generate, based on the per-pixel density map, a per-tile density map indicative of the at least one location of the at least one corner of the at least one 2D indicia within a 2D array of tiles that corresponds to the 2D array of pixels of the captured image; and generate, based on the per-tile density map, 2D indicia metadata indicative of the at least one location of the at least one 2D indicia within the captured image.

A method includes: receiving, at a programmable logic device, image data from an image sensor of a camera of a captured image captured by the image sensor, wherein the captured image includes a two-dimensional (2D) array of pixels; convolving, by the programmable logic device, a 2D indicia stencil in a non-rotated orientation about the 2D array of pixels of the captured image to generate non-rotated stencil data; generating, by the programmable logic device, at least one rotated stencil data based on a rotation of the 2D indicia stencil out of the non-rotated orientation and into at least one rotated orientation; generating, at the programmable logic device, and based on the non-rotated stencil data and the at least one rotated stencil data, a per-pixel density map indicative of at least one location of at least one corner of at least one 2D indicia within the 2D array of pixels of the captured image; employing noise filtering and subsampling to generate, by the programmable logic device, and based on the per-pixel density map, a per-tile density map indicative of the at least one location of the at least one corner of the at least one 2D indicia within a 2D array of tiles that corresponds to the 2D array of pixels of the captured image; and generating, by the programmable logic device, and based on the per-tile density map, 2D indicia metadata indicative of the at least one location of the at least one 2D indicia within the captured image.

Figure 1B:
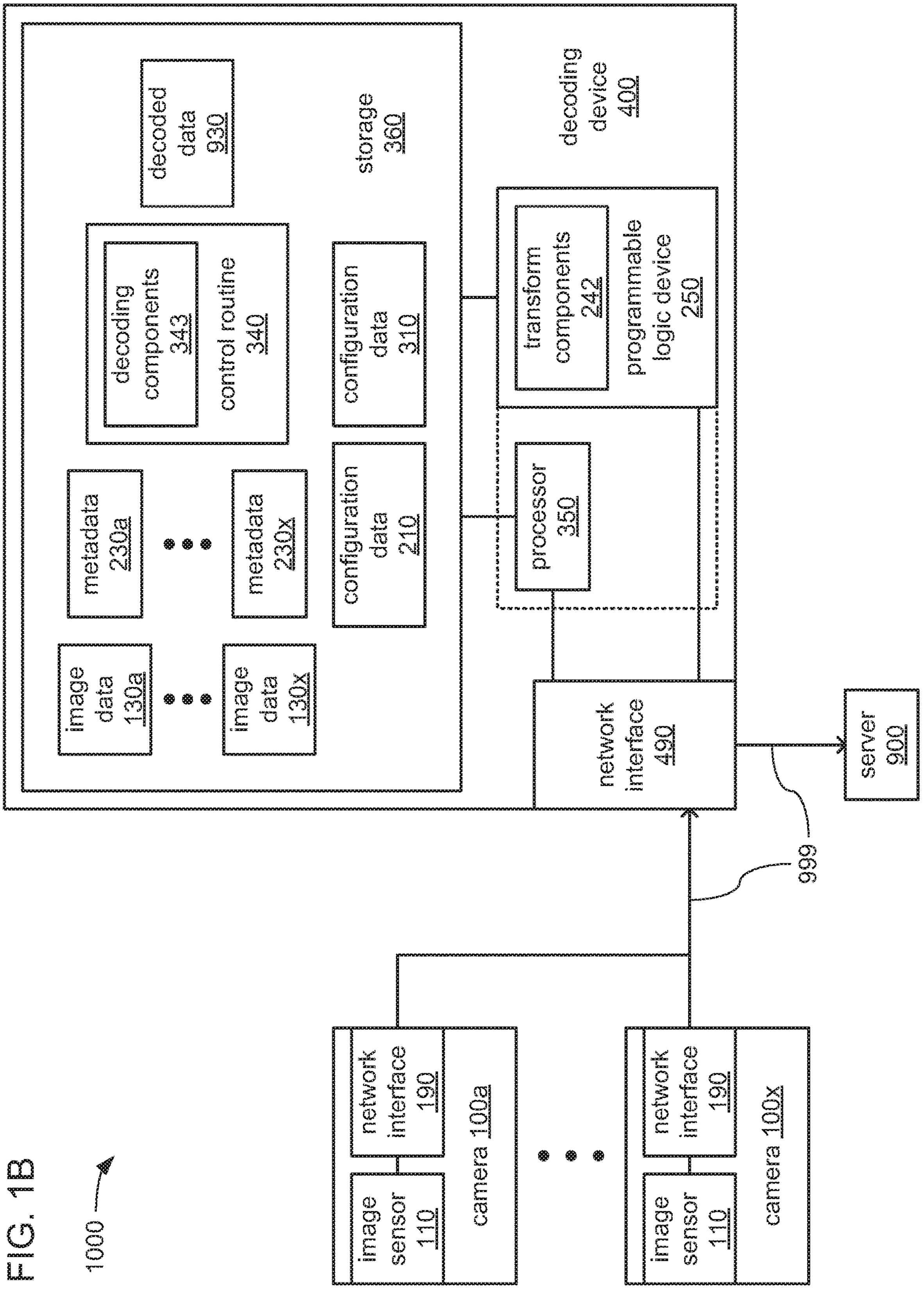

FIGS. 1A and 1B depict aspects of alternate example embodiments of an indicia decoding system 1000 that may include a plurality of cameras 100*a-x* coupled by a network 999 (e.g., cable-based and/or wireless links interconnecting devices) to a decoding device 400 and/or still another device, such as the depicted server 900. In the decoding systems 1000 depicted in each of FIGS. 1A and 1B, and as will be explained in greater detail, the cameras 100*a-x* may at least capture images of encoded data markings that are carried on the surfaces of objects. The cameras 100*a-x* or the decoding device 400 may then identify and decode at least 2D indicia from among the encoded data markings that may be present within such captured images. Following such decoding, the cameras 100*a-x* or the decoding device 400 may further transmit the decoded data to another device, such as the depicted example server 900, through the network 999.

Turning more specifically to the illustrative implementation of FIG. 1A, each of the one or more cameras 100*a-x* may include an image sensor 110, a programmable logic device 250, a processor 350, a storage 360 and/or a network interface 190 to provide coupling to the network 999. Within each of the cameras 100*a-x*, the storage 360 may store a corresponding one of the image data 130*a-x*, a corresponding one of the metadata 230*a-x*, configuration data 210 and/or 310, a control routine 340, and/or decoded data 930.

As indicated with dotted lines, the processor 350 may be integrated with the programmable logic device 250. In some of such embodiments, the combination of the programmable logic 250 and the processor 350 may form a system-on-a-chip (SOC). As will be familiar to those skilled in the art, such an SOC may implement both the programmable logic 250 and the processor 350 on the same semiconductor die, thereby provide a relatively compact multifunction micro-electronic device that may enable each of the cameras 100*a-x* to be of relatively compact size, despite incorporating considerable processing capability.

Within each of the cameras 100*a-x*, the image sensor 110 and logic device 250 may be communicatively coupled to exchange data therebetween through the exchange of electrical, optical, magnetic and/or other signals through one or more buses and/or other form of interconnect. As will be explained in greater detail, the image sensor 110 may capture an image within its field of view and provide the captured image to the programmable logic device 250 to identify the locations of at least 2D indicia therein.

Both of the programmable logic device 250 and the processor 350 may both be communicatively coupled to the storage 360 to exchange data therewith through the exchange of electrical, optical, magnetic and/or other signals through one or more buses and/or other form of interconnect. In embodiments in which the processor 350 is integrated with the programmable logic device 250, the processor 350 and the programmable logic device 250 may share a coupling to the storage 360 for such exchanges therewith. Regardless of the exact manner in which the programmable logic 250 and the processor 350 may be coupled to the storage 360, and as will be explained in greater detail, the programmable logic 250 may relay the captured image that it receives from the image sensor 110 to the storage 360, along with indications of the identified locations of at least 2D indicia therein. The processor 350 may subsequently retrieve the captured image and such indications from the storage 360 to decode such 2D indicia within the captured image.

The processor 350 and the network interface 190 may be communicatively coupled to exchange data therebetween through the exchange of electrical, optical, magnetic and/or other signals through one or more buses and/or other form of interconnect. As will be explained in greater detail, the processor may relay data that has been successfully decoded from at least 2D indicia present in the captured image to the network interface 190 to transmit to the server 900 via the network 999.

The programmable logic device 250 may include programmable and/or other forms of circuitry to implement the logic of one or more transform components 242. The programmable logic 250 may operate the image sensor 110 to receive a stream of data bits from the image sensor 110, which may convey an image captured by the image sensor 110. The programmable logic device 250 may temporarily store the received data bits of the captured image in the storage 360 as a corresponding one of image data 130*a-x*. However, the programmable logic device 250 may also, itself, buffer multiple full lines of the pixels represented by those data bits. The one or more transform components 241 may convolve one or more stencils about the pixels within those buffered lines, as well as employ one or more transforms, to generate a corresponding one of the metadata 230*a-x* that indicates locations identified in the captured image at which a 2D indicia may be found. The programmable logic may also temporarily store the corresponding one of the metadata 230*a-x* within the storage 360.

The control routine 340 may incorporate a sequence of instructions operative on the processor 350 to implement logic to perform various functions. In executing the control routine 340, the processor 350 within each of the cameras 100*a-x* may be caused to retrieve the corresponding ones of the image data 130*a-x* and the metadata 230*a-x* from the storage 360. The processor 350 may perform, at each location within the captured image indicated in the corresponding one of the metadata 230*a-x*, an attempt at interpretation of a 2D indicia thereat to decode data that may be encoded within each such 2D indicia. The processor 350 may temporarily store the data that is successfully decoded from such 2D indicia within the storage 360 as the decoded data 930, and/or may operate the network interface 190 to transmit the decoded data 930 to another device via the network, such as the depicted server 900.

As just discussed and as depicted in FIG. 1A, embodiments of the decoding system 1000 are possible in which each of the cameras 100*a-x* incorporates the processing, storage and/or other logical components to enable each of the cameras 100*a-x* to perform the locating and decoding of at least 2D indicia within an image that it captures. However, and as depicted in FIG. 1B, other embodiments of the decoding system 1000 are possible in which the separate and distinct decoding device 400 incorporates such processing, storage and/or other logical components to enable the decoding device 400 to perform such functions for images captured by each of the cameras 100*a-x*.

Thus, and turning more specifically to the illustrative implementation of FIG. 1B, each of the cameras 100*a-x* may include the image sensor 110 and the network interface 190 to couple each of the cameras 100*a-x* to the network 999, but not include any of the programmable logic 250, the processor 350 or the storage 360. Within each of the cameras 100*a-x*, the image sensor 110 and the network interface 190 may be directly communicatively coupled to exchange data therebetween through the exchange of electrical, optical, magnetic and/or other signals through one or more buses and/or other form of interconnect. The image sensor 110 within each of the cameras 110*a-x* may capture one or more images within its field of view and provide the captured one or more images to the network interface 190 to transmit to the decoding device 400 via the network 999.

The decoding device 400 may include the programmable logic device 250, the processor 350, the storage 360 and/or a network interface 490 to provide coupling to the network 999. Within the decoding device 400, the storage 360 may store each one of the image data 130*a* through 130*x*, each one of the metadata 230*a* through 230*x*, the configuration data 210 and/or 310, the control routine 340, and/or a single instance of the decoded data 930. Again, the processor 350 may be integrated with the programmable logic device 250, and in so doing, may form an SOC.

Within the decoding device 400, the network interface 490 and the programmable logic device 250 may be communicatively coupled to exchange data therebetween through the exchange of electrical, optical, magnetic and/or other signals through one or more buses and/or other form of interconnect. The programmable logic device 250 may operate the network interface 490 to receive captured images from each of the cameras 100*a-x* via the network 999.

Again, both of the programmable logic device 250 and the processor 350 may both be communicatively coupled to the storage 360 to exchange data therewith through the exchange of electrical, optical, magnetic and/or other signals through one or more buses and/or other form of interconnect. Also again, in embodiments in which the processor 350 is integrated with the programmable logic device 250, the processor 350 and the programmable logic device 250 may share a coupling to the storage 360 for such exchanges therewith. The programmable logic 250 may relay the captured images that it receives from each of the cameras 100*a-x* to the storage 360, along with indications of the identified locations of at least 2D indicia within each of those captured images. The processor 350 may subsequently retrieve each captured image and its corresponding indications of locations of at least 2D indicia from the storage 360 to decode at least 2D indicia within that captured image.

The processor 350 and the network interface 490 may also be communicatively coupled to exchange data therebetween through the exchange of electrical, optical, magnetic and/or other signals through one or more buses and/or other form of interconnect. The processor may relay data that has been successfully decoded from at least 2D indicia present in each of the captured images received from one of the cameras 100*a-x* to the network interface 490 to transmit to the server 900 via the network 999.

Thus, within the decoding device 400, the programmable logic 250 may operate the network interface 490 to receive separate streams of data bits from each of the cameras 100*a-x*, each of which may convey an image captured by the image sensor 110 thereof. The programmable logic device 250 may temporarily store the received data bits of the captured image from each camera in the storage 360 as a corresponding one of image data 130*a-x*. The programmable logic device 250 may also, itself, buffer multiple full lines of the pixels represented by the data bits within the stream received from each of the cameras 100*a-x*. For each captured image provided by one of the cameras 100*a-x* and stored as one of the image data 130*a-x*, the one or more transform components 241 may convolve one or more stencils about the pixels within corresponding ones of those buffered lines, as well as employ one or more transforms, to generate a corresponding one of the metadata 230*a-x* that indicates locations identified in that captured image at which a 2D indicia may be found. The programmable logic may also temporarily store the corresponding one of the metadata 230*a-x* within the storage 360.

In executing the control routine 340, the processor 350 within the decoding device 400 may be caused to retrieve each of the image data 130*a* through 130*x*, along with corresponding ones of the metadata 230*a* through 230*x* from the storage 360. For each captured image provided by one of the cameras 100*a-x* and stored as one of the image data 130*a-x*, the processor 350 may perform, at each location within that captured image indicated in the corresponding one of the metadata 230*a-x*, an attempt at interpretation of a 2D indicia thereat to decode data that may be encoded within each such 2D indicia. The processor 350 may temporarily store the data that is successfully decoded from such 2D indicia within each of the captured images within the storage 360 in the single instance of the decoded data 930, and/or may operate the network interface 490 to transmit the decoded data 930 to another device via the network, such as the depicted server 900.

Still referring to FIG. 1, the image sensor 110 within each of the one or more cameras 100*a-x* may be based on any of a variety of technologies and may employ any of a variety of optical scanning and/or other image capturing techniques to capture an image of an indicia and/or a digital watermark carried by a portion of an object. More specifically, the image sensor 110 may include any of a variety of light sensing components to effect the capture of an image that may include one or more indicia and/or digital watermarks, including and not limited to, a charge-coupled device (CCD) providing a single row of individual light sensors operated in a manner that sweeps over indicia and/or digital watermarks to perform a scan thereof, or a CCD providing a two-dimensional (2D) array of individual light sensors to capture a 2D image of one or more indicia and/or digital watermarks. In some embodiments, the image sensor 110 and/or another component of the camera 100 may emit various forms of collimated and/or monochromatic light, including light that projects any of a variety of patterns onto a surface of an object that carries one or more indicia and/or digital watermarks. As those skilled in the art will readily recognize, such an emission of light may be to provide sufficient illumination to ensure that an indicia and/or a digital watermark is sufficiently visible to be captured, and/or may provide a visible pattern of markers on a surface of an object, an indicia and/or a digital watermark as a guide to determining the orientation of the indicia and/or digital watermark relative to the image sensor 110 to improve the accuracy with which the data encoded within the indicia may be decoded.

The skew sensor 112 that may be present within at least a subset of the one or more cameras 100*a-x* may be based on any of a variety of technologies and/or may employ any of a variety of optical, sonic, magnetic, mechanical and/or other techniques to detect a degree of skew between the plane of a surface of the object that may carry one or more indicia and/or digital watermarks and the plane of the image captured by the image sensor 110. Alternatively or additionally, the emission of collimated light and/or other technologies incorporated into the image sensor 110 and/or each of the one or more cameras 100*a-x* may be employed to detect such a degree of skew.

The object onto which one or more encoded data markings may be applied may be any of a variety of objects, including and not limited to, a package carrying a shipping label that includes encoded data marking(s), or a product for sale within retail packaging on which encoded data marking (s) are printed as part of the graphical artwork thereof. The data encoded within such encoded data markings may include, and not be limited to, data indicating the addresses of a sender and/or intended recipient of a package, or data providing a universal product code (UPC) that uniquely identifies a product for sale.

Each encoded data marking that is implemented as an indicia may be any of a variety of forms of 1D optically readable indicia (e.g., a barcode) or 2D optically readable indicia (e.g., a QR code), including and not limited to, one or more of Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; PostBar; POSTNET; RM4SCC/KIX; Telepen; UPC; Aztec Code; Code 1; ColorCode; Color Construct Code; CrontoSign; CyberCode; d-touch; DataGlyphs; Data Matrix; Datastrip Code; digital paper; EZcode; Color; High Capacity Color Barcode; HueCode; InterCode; MaxiCode; MMCC; NexCode; Nintendo e-Reader; Dotcode; PDF417; QR code; ShotCode; and SPARQCode.

The storage 360 may be based on any of a variety of volatile storage technologies, including and are not limited to, random-access memory (RAM), dynamic RAM (DRAM), Double-Data-Rate DRAM (DDR-DRAM), synchronous DRAM (SDRAM), static RAM (SRAM), etc. Alternatively or additionally, the storage 360 may be based on any of a variety of non-volatile storage technologies.

The processor 350 may include any of a wide variety of processors, microcontrollers, gate-array logic devices, etc. that may be incorporate any of a variety of features to enhance speed and/or efficiency of processing operations. Such features may include and are not limited to, multi-threading support per core component 351, multiple processing core components 351, directly integrated memory control functionality, and/or various modes of operation by which speed of throughput and/or level of power consumption may be dynamically altered.

Each processor 350 may be implemented as a single semiconductor die within a single package. Alternatively, each processor 350 may be implemented as multiple semiconductor dies incorporated into a single package, such as a multi-chip semiconductor package (e.g., a system-on-a-chip, or SOC) in which the multiple semiconductor dies may be interconnected in any of a variety of ways, including and not limited to, conductive wires extending between adjacent semiconductor dies, and/or a substrate formed from multiple layers of conductors separated by intervening layers of insulating material (e.g., a printed circuit board, or PCB) onto which the multiple semiconductor dies may be soldered.

Each of the network interfaces 190 and/or 390 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, the network interfaces 190 and/or 390 may each be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2:
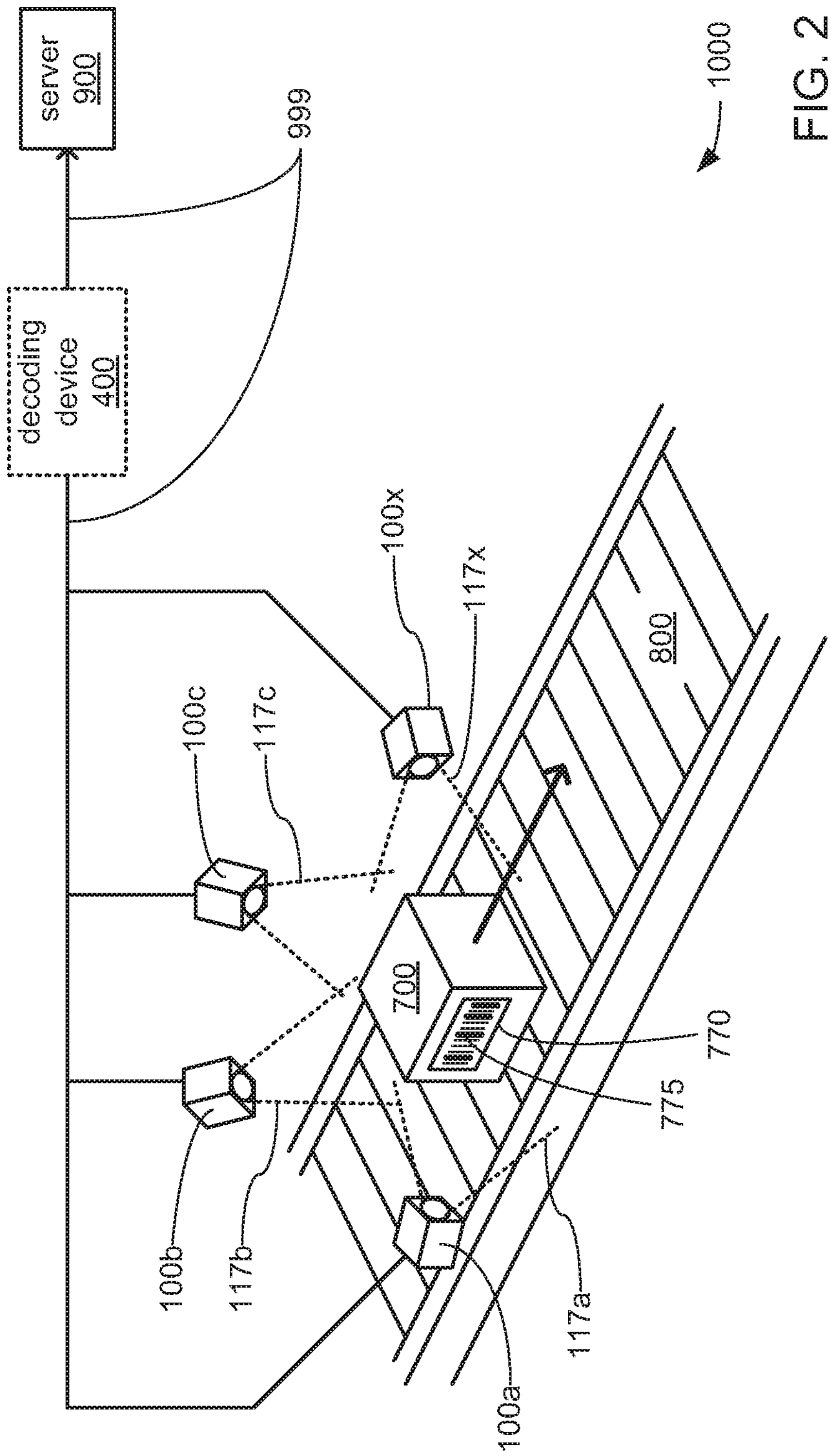
FIG. 2 shows aspects of an example use of the decoding system of either FIG. 1A or 1B.

FIG. 2 depicts aspects of an example of use of an example implementation of the decoding system 1000 of FIG. 1 in capturing, identifying and decoding encoded data markings 775 that may be applied to a label or portion 770 of a surface of an object 700 in the form of a package moved along the path of a conveyor belt 800. More specifically, FIG. 2 provides a combination of perspective view and block diagram of an example implementation of the decoding system 1000 that includes at least four cameras 100*a*, 100*b*, 100*c* and 100*x* positioned in a manner that surrounds a location along the path of the conveyor belt 800, which becomes the path along which the object 700 is moved. It should be noted that this depiction of this example use of this example implementation of the decoding system 1000 is but one possible example provided herein for purposes of illustration, and should not be taken as limiting. Stated differently, other uses of other implementations of the decoding system 1000 are possible in which the object 700 may be any of a variety of objects other than a package moved along a conveyor belt, in which a different quantity of the cameras 100*a-x* may be used, and/or in which each of the cameras 100*a-x* may be mounted as a set to a vehicle such that it is the cameras 100*a-x* of the decoding system 1000 that are moved relative to the object 700, instead of the object 700 being moved relative to the cameras 100*a-x*.

As depicted in FIG. 2, the at least four cameras 100*a-x* are positioned to cause at least a portion of a location along the conveyor 800 to be placed within each of the FOVs 117*a-x* of the image sensor 110 within each of the cameras 100*a-x*, respectively. As depicted, two or more of the FOVs 117*a-x* may overlap. However, it should be noted that embodiments are possible in which none of the FOVs 117*a-x* overlap. Indeed, other embodiments are possible in which two or more of the cameras 100*a-x* may be positioned to place entirely different locations along the path of the conveyor belt 800 within their respective ones of the FOVs 117*a-x*.

Stated differently, the at least four cameras 100*a-x* may be positioned to cover a single location along the conveyor 800 such that each is able to capture an image of a different portion of the object 700 simultaneously as the object 700 moves along the path of the conveyor belt 800, or the at least four cameras 100*a-x* may be positioned to cover different locations along the path of the conveyor belt 800 such that each is able to capture an image of a different portion of the object 700 as the object 700 moves through their separate ones of the FOVs 117*a-x* at different times.

Regardless of the manner in which the at least four cameras 100*a-x* are positioned relative to one or more locations along the path of the conveyor belt 800, and as has been discussed in reference to FIG. 1, each of the at least four cameras 100*a-x* may be communicatively coupled to the server 900 via the network 999, and either directly or through the decoding device 400 through the network 999. As has been discussed, each of the cameras 100*a-x* may individually identify and decode at least 2D indicia within an image that each captures, or each of the cameras 100*a-x* may cooperate with the decoding device 400 through the network 999 to do so. Also as discussed in reference to FIG. 1, following such decoding, the resulting decoded data 930 may be transmitted by each of the cameras 100*a-x* or by the decoding device 400 to another device via the network 999, such as the depicted server 900.

Figure 3:
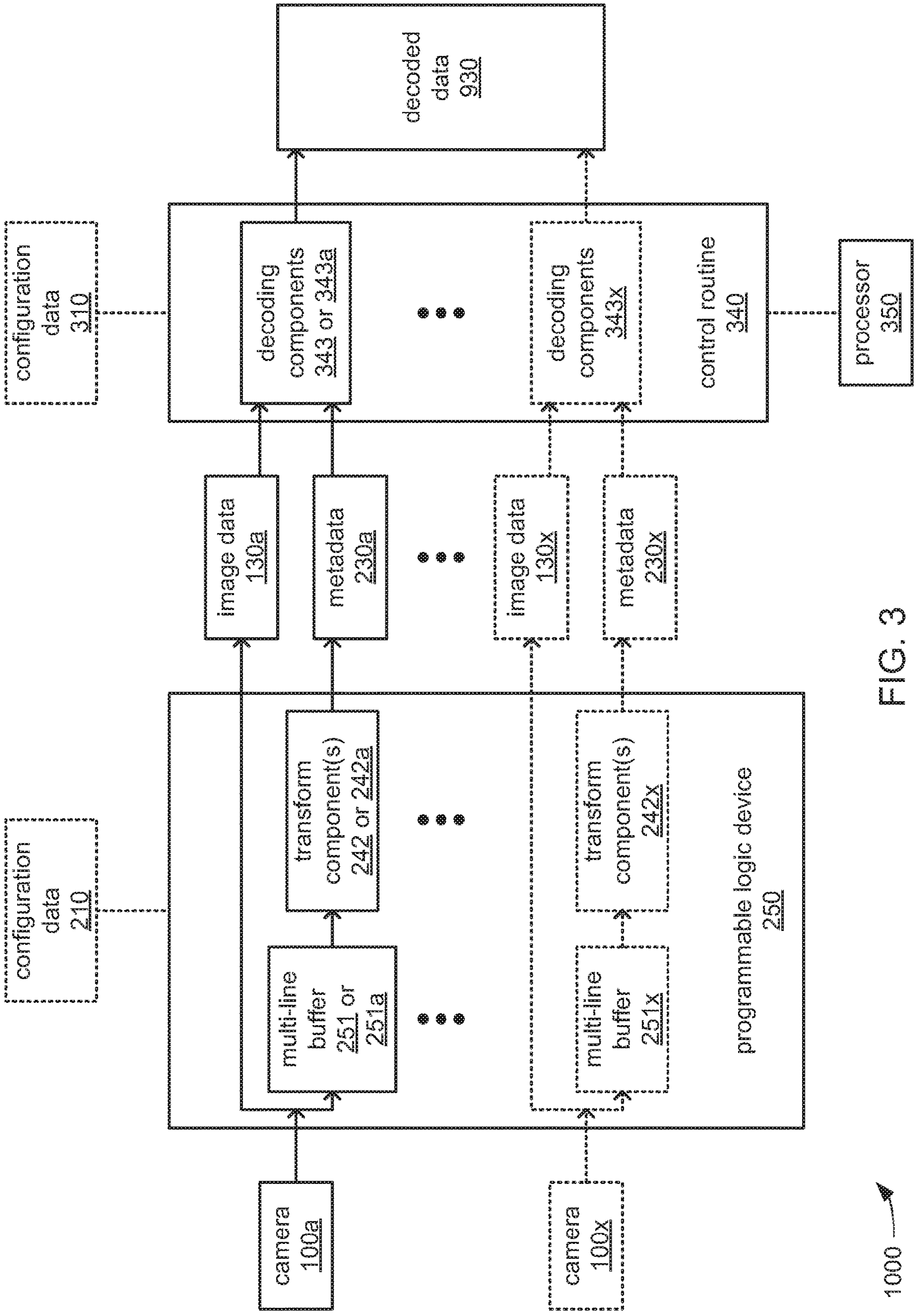
FIG. 3 shows aspects of an example internal decoding architecture of the decoding system of either FIG. 1A or 1B.

FIG. 3 depicts aspects of an example embodiment of an internal architecture either for the cameras 100*a-x* of the decoding system 1000 of FIG. 1A, or for the decoding device 400 of the decoding system 1000 of FIG. 1B. Thus, the programmable logic device 250, the processor 350 and the instance of the control routine 340 depicted in FIG. 3 may be incorporated into each of the cameras 100*a-x* or into the decoding device 400.

As previously discussed, in embodiments in which there is a separate programmable logic device 250 that is incorporated into each one of the cameras 100*a-x*, each separate programmable logic device 250 within one of the cameras 100*a-x* may receive a bit stream of lines of pixels of a captured image from its corresponding image sensor 110, and may temporarily store that bit stream as a corresponding one of the image data 130*a-x*. However, each of the programmable logic devices 250 incorporated into each of the cameras 100*a-x* may incorporate a multi-line buffer 251 that buffers a preselected quantity of the most recently received lines of pixels of the image captured by the corresponding image sensor 110.

Each such programmable logic device 250 may also incorporate one or more transform components 242. As will be explained in greater detail, in some embodiments of the decoding system 1000, other forms of encoded data marking than 2D indicia may also be identified and decoded such that there may be multiple ones of the transform components 242 implemented.

Similarly, in embodiments in which there is a separate processor 350 executing a separate instance of the control routine 340 within each one of the cameras 100*a-x*, each separate processor 350 may be caused to retrieve the corresponding ones of the image data 130*a-x* and the metadata 230*a-x*, and may perform, at each location indicated in the corresponding one of the metadata 230*a-x*, an attempt at interpretation of a 2D indicia to decode data that may be encoded within each such 2D indicia. The processor 350 may temporarily store the data that is successfully decoded as an instance of the decoded data 930 for subsequent transmission to the server 900.

As also previously discussed, in embodiments in which there is a single programmable logic device 250 that is incorporated into the decoding device 400, such a single programmable logic device 250 may receive bit streams of lines of pixels of a separate captured image from each of the cameras 100*a-x*, and may separately temporarily store each of those bit streams as a corresponding one of the image data 130*a-x*. However, such a single programmable logic device 250 may also incorporate multiple multi-line buffers 251*a-x* that each buffer a preselected quantity of the most recently received lines of pixels of the corresponding captured image received from a corresponding one of the cameras 100*a-x*.

Such a single programmable logic device 250 may also incorporate one or more transform components 242 that correspond to each of the cameras 100*a-x*. Again, as will be explained in greater detail, in some embodiments of the decoding system 1000, other forms of encoded data marking than 2D indicia may also be identified and decoded such that, for each one of the cameras 100*a-x*, there may be multiple ones of the transform components implemented within the programmable logic device 250. Thus, the single programmable logic device 250 incorporated into the decoding device 400 may incorporate a separate one or more transform components 242*a* through 242*x* corresponding to cameras 100*a* through 100*x*.

Similarly, in embodiments in which there is a single processor 350 executing a single instance of the control routine 340 within the decoding device 400, the processor 350 may be caused to retrieve each one of the image data 130*a-x* and its corresponding one of the metadata 230*a-x*. For image captured by one of the cameras 100*a-x* and stored as a corresponding one of the image data 130*a-x*, the processor 350 may be caused to perform an attempt at interpretation of a 2D indicia at each location indicated in the corresponding one of the metadata 230*a-x*. The processor 350 may temporarily store the data that is successfully decoded from each such 2D indicia in each of the captured images as a single instance of the decoded data 930 for subsequent transmission to the server 900.

Figure 4A:
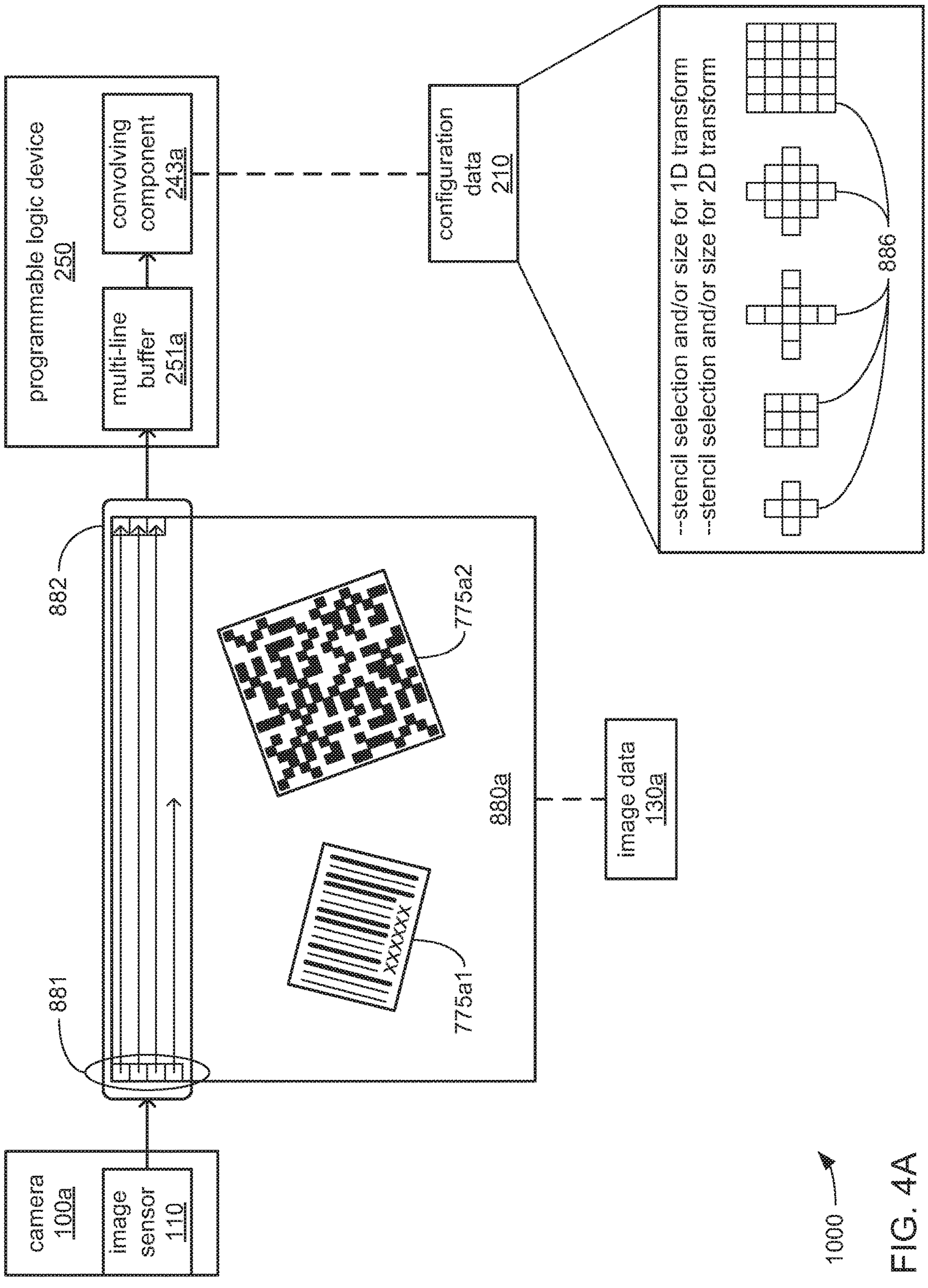
FIGS. 4A, 4B and 4C, together, show aspects of convolving one or more stencils to perform one or more transforms.
Figure 4B:
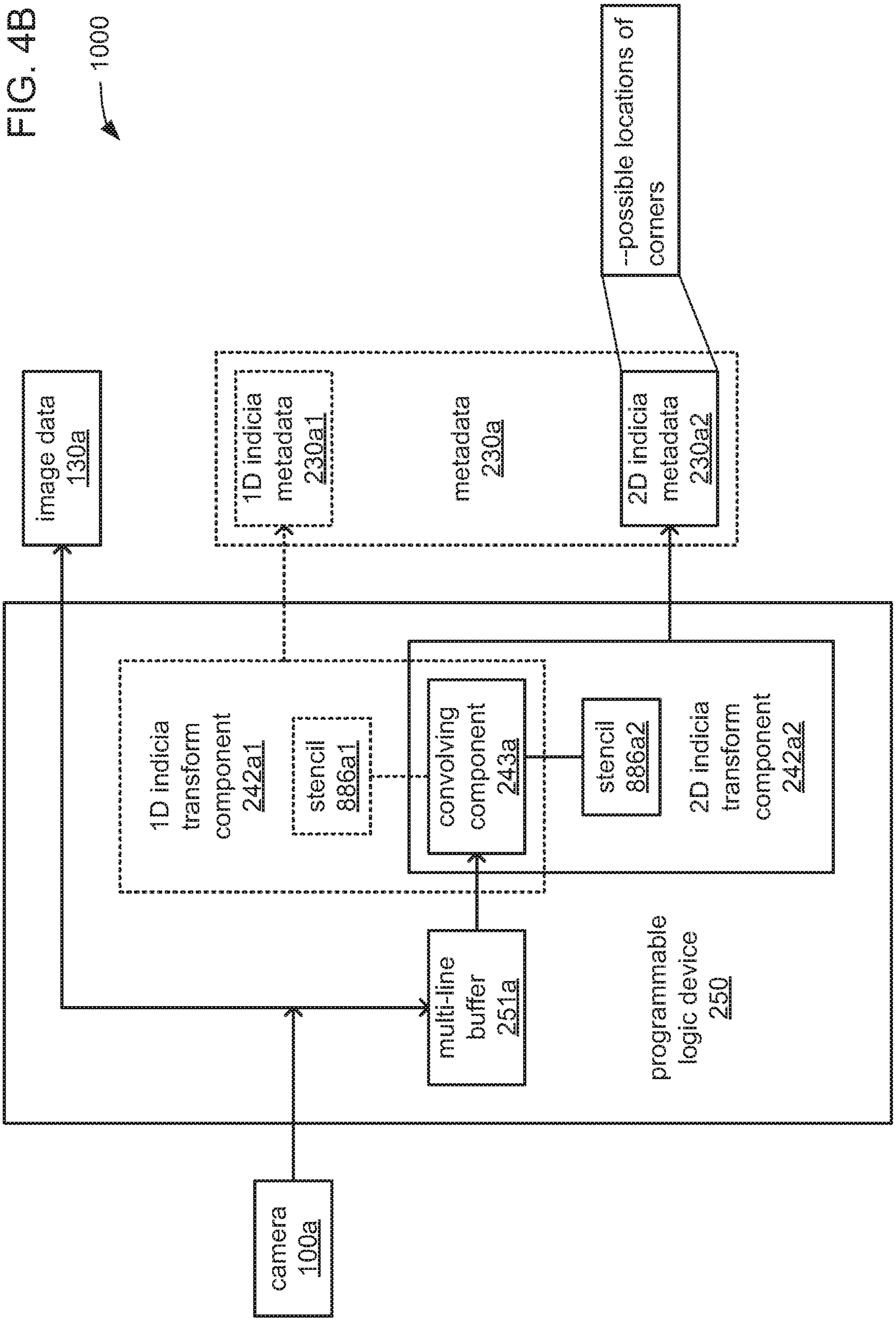
Figure 4C:
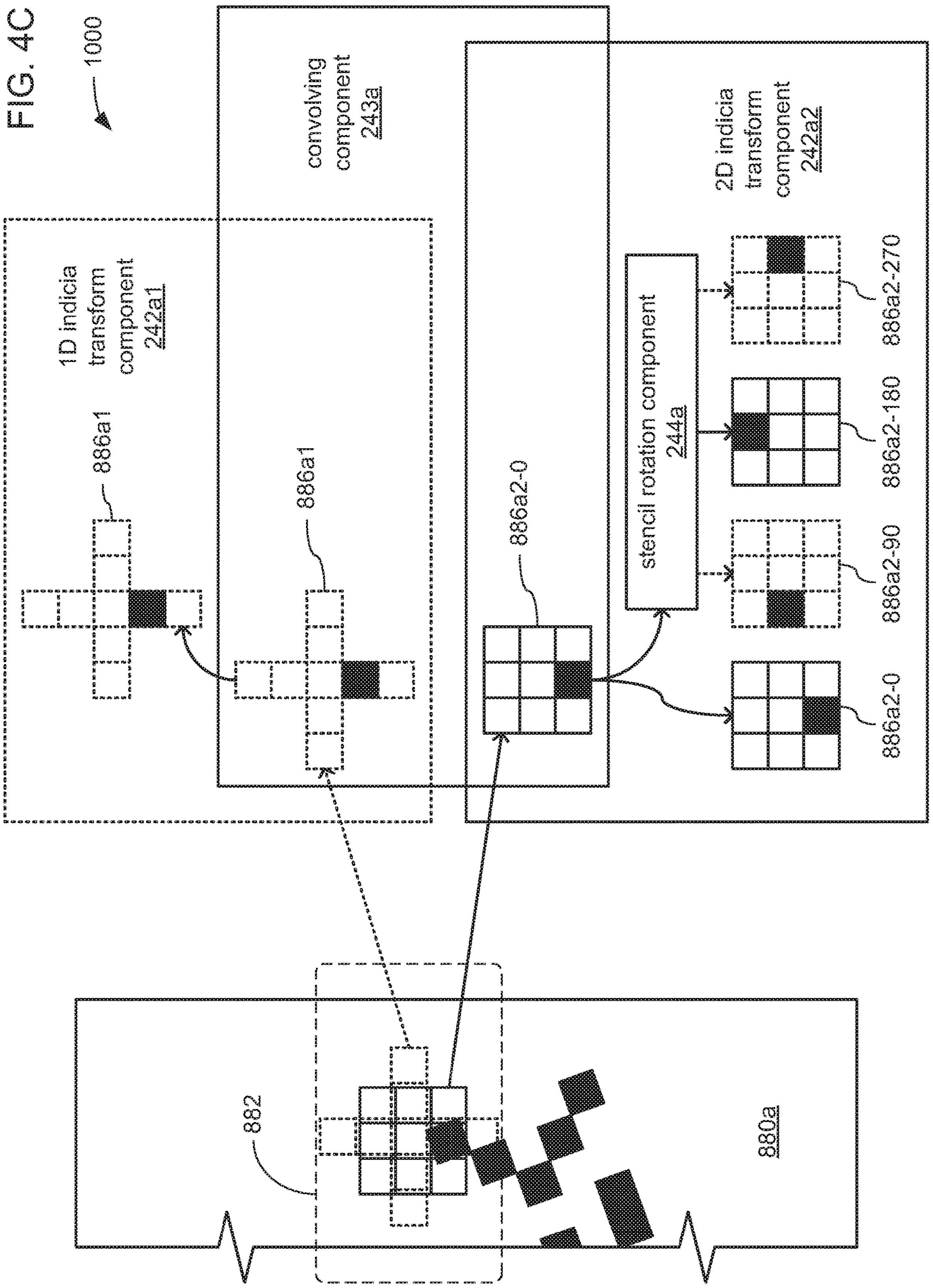

FIGS. 4A, 4B and 4C, together, depict aspects of an example of the use of one or more transforms that entail convolving one or more stencils to identify 2D indicia and/or other encoded data markings within a captured image. FIG. 4A depicts aspects of receiving a bit stream of values for pixels 881 of a captured image 880*a*, and of the selection of one or more stencils 886 to be convolved about lines 882 of the pixels 881 of the captured image 880*a*. FIGS. 4B and 4C, together, depict aspects of the performance of such convolving with one or more stencils 886 as part of implementing one or more transforms to identify at least 2D indicia within the captured image 880*a*.

It should be noted that, for the sake of simplicity of discussion, FIGS. 4A-C and this accompanying discussion focus on implementation details associated with the camera 100*a* in an implementation of the example embodiment of the decoding system 1000 of FIG. 1A. Thus, the implementation details depicted in and discussed in reference to FIG. 4A-C are of the manner in which, within the camera 100*a*, at least 2D indicia may be searched for an identified within the captured image 880*a* that is captured by the camera 100*a*.

Turning to FIG. 4A, the image sensor 110 of the camera 100*a* of a decoding system 1000 of FIG. 1A may capture the image 880*a* in its FOV 117 of a label or portion 770 of an object 700 (see FIG. 2) that may carry multiple markings that are visible within the captured image 880*a*. More specifically, in this depicted example of the captured image 880*a* the visible markings include two encoded data markings 775: a 1D indicia 775-1 (e.g., a 1D barcode), and a 2D indicia 775-2 (e.g., a 2D barcode, such as a QR code). As has been discussed, in some embodiments, the identification and decoding of encoded data markings 775 may be limited to 2D indicia, such as the depicted example 2D indicia 775-2. However, and as also discussed, in other embodiments, such identification and decoding may also include other types of encoded data markings 775, such as the depicted example 1D indicia 775-1.

As will be familiar to those skilled in the art, at least in embodiments in which the image sensor 110 is implemented as a CCD or other type of light sensing device incorporating a 2D array of light sensing elements, the image sensor 110 may output a serial bitstream of values indicating the grayscale levels detected by separate ones of the light sensing elements of the pixels 881 of the captured image 880*a*. As depicted, the order in which those grayscale values in the serial bitstream are output by the image sensor 110 may follow a left-to-right raster scan order within each horizontal line 882 of pixels 881 of the captured image 880*a*, starting with the top-most line 882 progressing line-by-line from top-to-bottom of the captured image 880*a*.

In some embodiments, the decoding system 1000 may be configured to trigger the camera 100*a* to capture an image of at least a portion of an object 700 in response to placement of the object 700 within its FOV 117 (see FIG. 2). Thus, there may be only the one captured image 880*a* captured by the image sensor 110 to be processed. Such triggering may be based on the output of a sensor (not shown) that detects the proximity of the object 700. Alternatively, in other embodiments, the decoding system 1000 may be configured to cause the camera 100*a* to recurringly capture images on a timed basis, such as at selected frame rate. Thus, at a recurring interval of time, the image sensor 110 of the camera 100*a* would capture a new image to be processed, where each such image may or may not include an image of an object 700 that carries any encoded data markings 775, whatsoever. Regardless of whether the image sensor 110 captures only the single captured image 880*a* of the object 700, or multiple images in a succession in which only a subset may include an image of the object 700, the bitstream received from the sensor 110 of the captured image(s) 880*a* may be stored as the image data 130*a* within the storage 360. More precisely, the grayscale values of the pixels 881 of the captured image 880*a* may be stored by as the image data 130*a*.

In some embodiments, the image sensor 110 of the camera 100*a* may be a monochrome image sensor capable of capturing monochromatic images such that there is only a single grayscale value for each pixel 881. In such embodiments, each of the grayscale values may be a byte-wide (i.e., 8-bit) value that specifies an intensity level of a separate one of the pixels 881 (although grayscale values of greater or lesser bit width may also be used). However, in other embodiments, the image sensor 110 of the camera 100*a* may be a color image sensor capable of capturing color images such that there may be multiple values for each pixel 881, including one or more grayscale values for each pixel 881. More precisely, in such other embodiments, a color space encoding scheme may be used in which the color of each pixel 881 is specified with multiple grayscale values that each specify a relative level of intensity of a different color component of the color, such as and not limited to, red-green-blue (RGB) or cyan-magenta-yellow-black (CMYK). RGB color space encoding often entails the allocation of 8, 12, 16, 24 or 32 bits per pixel to store the three grayscale values for the red, green and blue intensities. Alternatively, a color space encoding scheme may be used in which the color of each pixel 881 is specified with a single grayscale value that specifies an intensity level accompanied by one or more chrominance values that specify a color that is mapped to the one or more chrominance values, such as and not limited to, luminance-chrominance (YUV). Therefore, as used herein, the term "grayscale value" is intended to denote the single value specifying the level of intensity of either a single monochromatic pixel 881 or a single color pixel 881, or is intended to denote one of the multiple grayscale values specifying the level of intensity of a color component of one of the color components that specify the color of a single pixel 881.

In addition to being stored as the image data 130*a*, a preselected number of the lines 882 most recently provided in the bitstream conveying the image 880*a* may be buffered in the multi-line buffer 251*a*. This may enable a convolving component 243*a* of the programmable logic device 250 to convolve of one or more stencils 886 as part of implementing one or more transforms to identify at least 2D indicia. As depicted, it may be that the one or more stencils 886 that are to be so used are selectable from, or otherwise specifiable within, the configuration data 210.

Turning to FIG. 4B, as depicted, in embodiments in which the searching for and identification of encoded data markings 775 is limited to 2D indicia, the convolving component 243*a* may be incorporated into an implementation of a transform component 242*a* that is specific to the detection of 2D indicia, specifically, the depicted 2D indicia transform component 242*a*2. Other portions of the 2D indicia transform component 242*a*2 implementing other logic may use the data values retrieved through a corresponding 2D indicia stencil 886*a*2 employed in such convolving to generate a corresponding 2D indicia metadata 230*a*2 of the metadata 230*a*.

Depending on the particular transform implemented by the 2D indicia transform component 242*a*2, any of a variety of features of a type of 2D indicia may be searched for, and the locations at which such features are found within the captured image 880*a* may be specified in the 2D indicia metadata 230*a*2 to provide clues as to the possible location(s) of that type of 2D indicia within the captured image 880*a*. More specifically, and as will shortly be described in greater detail, it may be that the 2D indicia transform component 242*a*2 implements some form of a transform that identifies one or more types of 2D indicia (e.g., QR codes) by their corners. As depicted, where such a transform is used, the 2D indicia metadata 230*a*2 may provide indications of identified locations of possible corners of 2D indicia within the captured image 880*a*.

In some of such embodiments, the 2D indicia stencil 886*a*2 employed as part of implementing such a transform may be specified in the configuration data 210, along with the selection of the shape of the 2D indicia stencil 886*a*2. More specifically, in some embodiments, the 2D indicia stencil 886*a*2 may be specified to be of square shape of 8 pixels in height and in width.

However, in embodiments in which the searching for and identification of encoded data markings 775 also includes at least one other type thereof, such as 1D indicia, the convolving component 243*a* may be incorporated into multiple different implementations of the transform component 242*a* that are each specific to the detection of a different type of encoded data marking 775, such as both of the depicted transform components 242*a*1 and 242*a*2. In a manner similar to the 2D indicia transform component 242*a*2, other portions of the 1D indicia transform component 242*a*1 implementing other logic may use the data values retrieved through a corresponding 1D indicia stencil 886*a*1 employed in such convolving to generate a corresponding 1D indicia metadata 230*a*1 of the metadata 230*a*.

Depending on the particular transform implemented by the 1D indicia transform component 242*a*1, any of a variety of features of a type of 1D indicia may be searched for, and the locations at which such features are found within the captured image 880*a* may be specified in the 1D indicia metadata 230*a*1 to provide clues as to the possible location(s) of that type of 1D indicia within the captured image 880*a*. More specifically, and by way of example, it may be that the 1D indicia transform component 242*a*1 implements some form of the Saporetti transform (S-transform) to identify 1D barcodes by their characteristic parallel lines. Where the S-transform is so used, the 1D indicia metadata 230*a*1 may provide indications of identified locations of possible sets of parallel lines of 1D indicia within the captured image 880*a*. The Saporetti transform is described in the earlier-mentioned U.S. Pat. No. 6,047,893 issued Apr. 11, 2000 to Claudio Saporetti, the disclosure of which is incorporated herein by reference for all purposes.

In embodiments in which there are multiple transforms that are performed to search for multiple types of encoded data marking 775, and where more than one of those transforms employs the convolving of a stencil 886, the different convolving operations of those multiple transforms may be performed simultaneously by the convolving component 243*a* as an approach to decreasing the time required to perform what would otherwise be separate multiple convolving operations. More specifically, and by way of example, a superset of the stencils 886*a*1 and 886*a*2 may be convolved about the lines 882 of pixels 881 that are buffered within the multi-line buffer 251*a* to effect the retrieval of data values for the pixels 881 that would fall under either of the stencils 886*a*1 and 886*a*2. Appropriate ones of those data values may then be provided to each of the 1D indicia transform component 242*a*1 and the 2D indicia transform component 242*a*2 in the same manner as would have occurred had those data values been retrieved through separate convolving operations making separate use of each of the stencils 886*a*1 and 886*a*2.

Turning to FIG. 4C, in some embodiments, the 2D indicia transform component 242*a*2 may employ its associated 2D indicia stencil 886*a*2 multiple times with one or more geometric rotations as part of implementing a transform to search for and identify 2D indicia. More precisely, upon receiving data values that fall under the depicted non-rotated form of the 2D indicia stencil 886*a*2 (specifically, the non-rotated stencil 886*a*2-0), a stencil rotation component 244*a* may generate a copy of those same values reorganized in a manner that corresponds to the positions of the 2D indicia stencil 886*a*2 after being rotated at least once (e.g., after rotation by 180 degrees to become the depicted half-rotated stencil 886*a*2-180). As further depicted, other embodiments of such geometric rotation of the 2D indicia stencil 886*a*2 may include a quarter-rotated stencil 886*a*2-90 and a three-quarter rotated stencil 886*a*2-270.

As will shortly be explained in greater detail, various combinations of the non-rotated stencil 886*a*2-0 and one or more of the rotated stencils 886*a*2-90, 886*a*2-180 and/or 886*a*2-270 may be employed in the performance of the transform implemented by the 2D indicia transform component 242*a*2. Further, such use of rotation of the 2D indicia stencil 886*a*2 may be employed regardless of whether the convolving component 243*a* convolves the 2D indicia stencil 886*a*2 simultaneously with a stencil of another transform component employed to search for and identify any other type of encoded data marking.

Figure 5A:
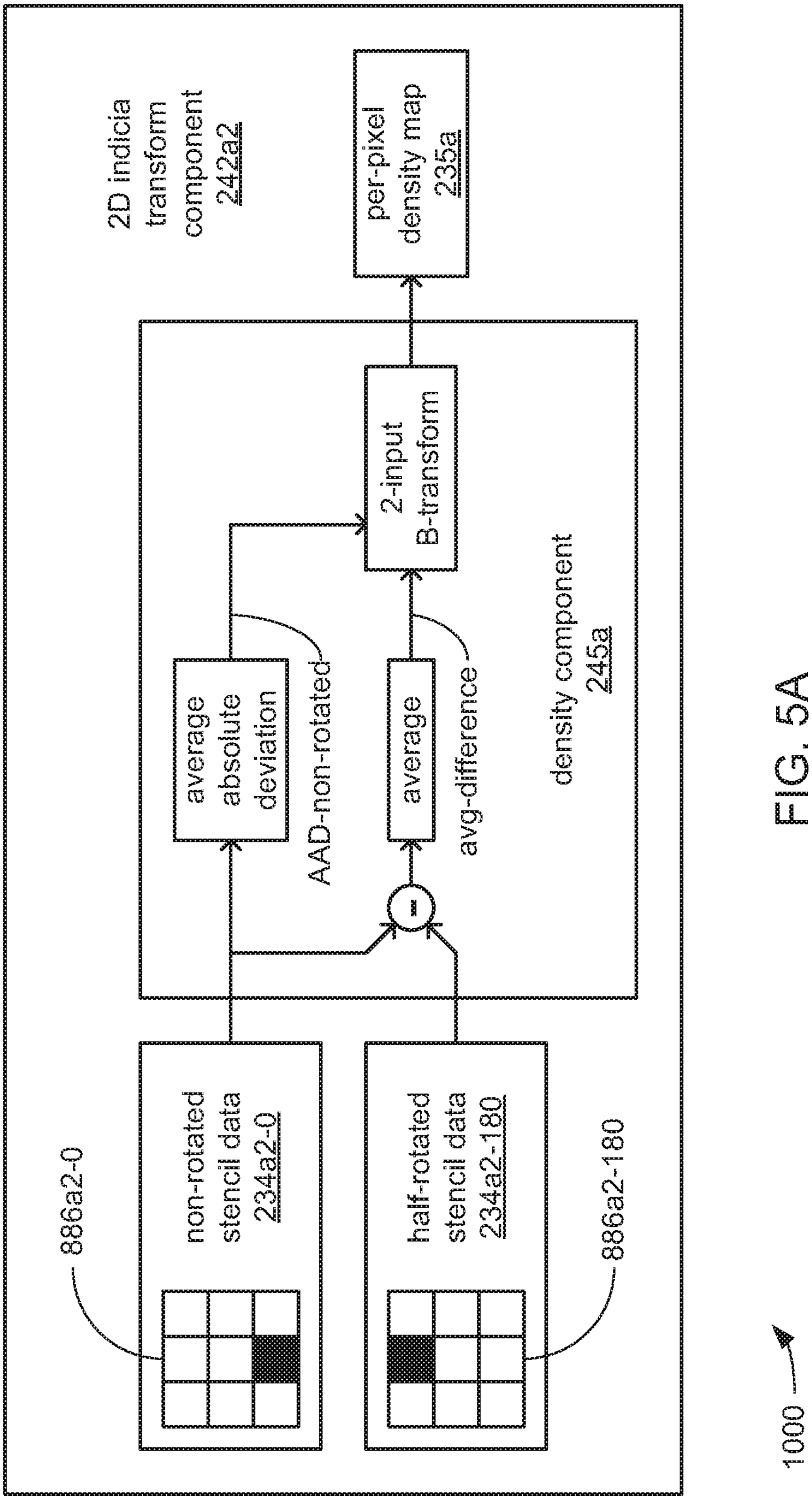
FIGS. 5A, 5B and 5C, together, show aspects of a transform for locating and identifying 2D indicia that employs pixel data values through both a non-rotated convolved stencil and at least one rotated convolved stencil as input.
Figure 5B:
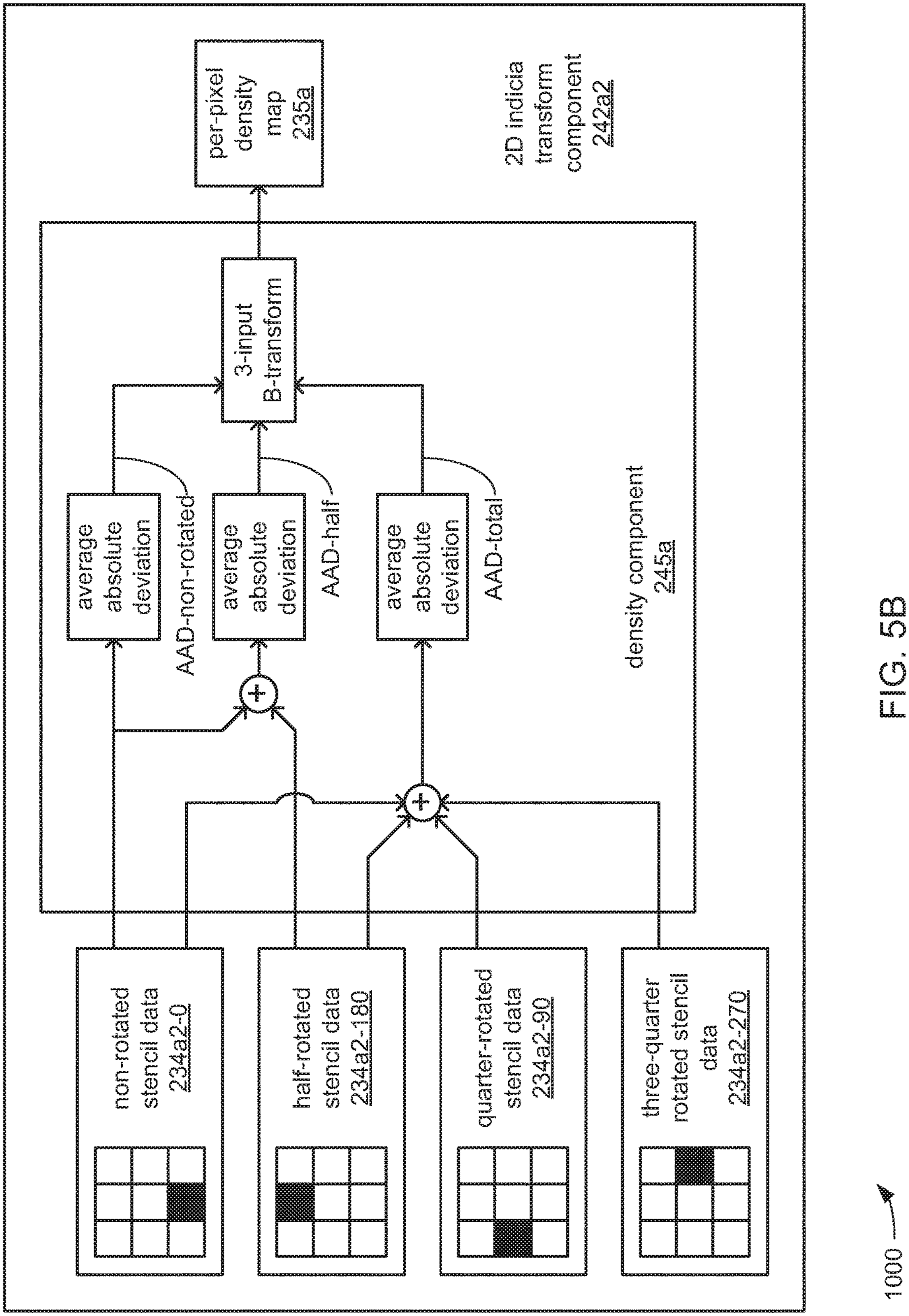
Figure 5C:
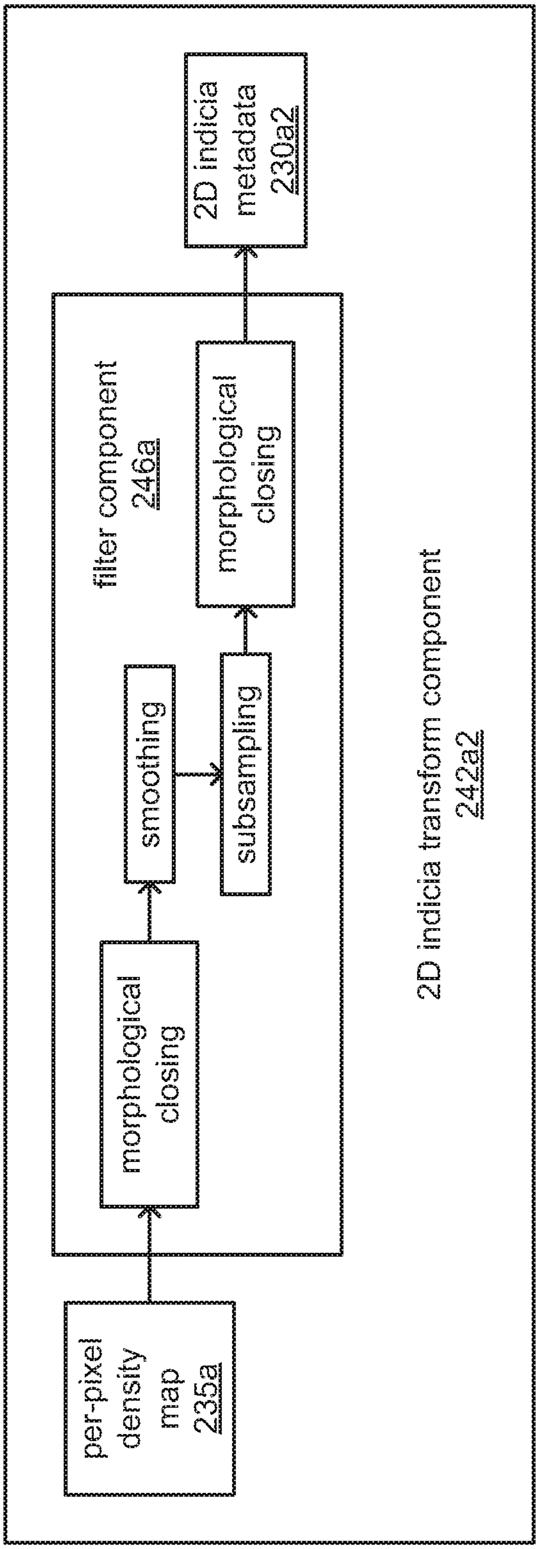

FIGS. 5A, 5B and 5C, together, depict aspects of an example of the use a 2D indicia transform to locate and identify 2D indicia that employs pixel data values provided through convolving the 2D indicia stencil 886*a*2 in non-rotated form (e.g., the non-rotated stencil 886*a*2-0) and the 2D indicia stencil 886*a*2 in at least one rotated form (e.g., the half-rotated stencil 886*a*2-180). FIG. 5A depicts aspects of one embodiment of such a transform in which the non-rotated form of the 2D indicia stencil 886*a*2 is used along with a single rotated form thereof. FIG. 5B depicts aspects of another embodiment of such a transform in which the non-rotated form of the 2D indicia stencil 886*a*2 is used along with three rotated forms thereof. FIG. 5C depicts aspects of a backend stage of either of the embodiments of FIG. 5A or 5B.

It should be noted that, for the sake of simplicity of discussion, FIGS. 5A-C and this accompanying discussion continue the focus of FIGS. 4A-C on implementation details associated with the camera 100*a* in an implementation of the example embodiment of the decoding system 1000 of FIG. 1A. Thus, like FIGS. 4A-C, the implementation details depicted in and discussed in reference to FIG. 5A-C are also of the manner in which, within the camera 100*a*, at least 2D indicia may be searched for an identified within the captured image 880*a* that is captured by the camera 100*a*.

Turning to FIG. 5A, as depicted, where a 2-input B-transform is used in searching for and identifying locations within the captured image 880*a* at which a 2D indicia may be present, a combination of pixel data values provided through both the non-rotated stencil 886*a*2-0 and the half-rotated stencil 886*a*2-180 may be used. More specifically, grayscale values of the pixels 881 of the captured image 880*a* that fall under the stencil 886*a* as it is convolved about the captured image 880*a* in its non-rotated form may be provided to the depicted embodiment of a density component 245*a* as non-rotated stencil data 234*a*2-0. Additionally, the very same grayscale values of the very same pixels 881 may also be provided to the depicted embodiment of the density component 245*a* as half-rotated stencil data 234*a*2-180 in which the stencil rotation component 244*a* (see FIG. 4C) has reorganized the grayscale values in a manner consistent with the stencil 886*a* having been rotated 180 degrees (i.e., half of a 360 degree rotation).

Within the density component 245*a*, an absolute average deviation may be taken of the grayscale values of the non-rotated stencil data 234*a*2-0, and the results thereof may then be provided to the 2-input B-transform as one of the two inputs thereto. Also within the density component 245*a*, an average may be taken of the differences between the grayscale values of the non-rotated stencil data 234*a*2-0 and of the half-rotated stencil data 234*a*2-180, and the results thereof may be provided to the 2-input B-transform as the other of the two inputs thereto. The 2-input B-transform may implement the following calculation for each pixel 881 of the captured image 880*a*:

$$\text{per-pixel density} = \frac{AAD\text{-non-rotated}}{avg\text{-difference}}$$

As the 2D indicia stencil **886*a*2 is convolved about the pixels 881 of the captured image 880*a*, the 2-input B-transform generates a per-pixel density map 235*a***.

Turning to FIG. 5B, as depicted, where a 3-input B-transform is used in searching for and identifying locations within the captured image **880*a* at which a 2D indicia may be present, a combination of pixel data values provided through both the non-rotated stencil 886*a*2-0, the half-rotated stencil 886*a*2-180, the quarter-rotated stencil 886*a*2-90 and the three-quarter rotated stencil 886*a*2-270 may be used. More specifically, grayscale values of the pixels 881 of the captured image 880*a* that fall under the stencil 886*a* as it is convolved about the captured image 880*a* in its non-rotated form may be provided to the depicted embodiment of a density component 245*a* as non-rotated stencil data 234*a*2-0. Additionally, the very same grayscale values of the very same pixels 881 may also be provided to the depicted embodiment of the density component 245*a* as the half-rotated stencil data 234*a*2-180 in which the stencil rotation component 244*a* (see FIG. 4C) has reorganized the grayscale values in a manner consistent with the stencil 886*a* having been rotated 180 degrees; as the quarter-rotated stencil data 234*a*2-90 in which the stencil rotation component 244*a* has reorganized the grayscale values in a manner consistent with the stencil 886*a* having been rotated 90 degrees; and as the three-quarter rotated stencil data 234*a*2-270 in which the stencil rotation component 244*a* has reorganized the grayscale values in a manner consistent with the stencil 886*a*** having been rotated 270 degrees.

Within the density component **245*a*, an absolute average deviation may be taken of the grayscale values of the non-rotated stencil data 234*a*2-0, and the results thereof may then be provided to the 3-input B-transform a first one of the three inputs thereto. Also within the density component 245*a*, an average absolute deviation may be taken of the sum of the grayscale values of the non-rotated stencil data 234*a*2-0 and of the half-rotated stencil data 234*a*2-180, and the results thereof may be provided to the 3-input B-transform as the second one of the three inputs thereto. Further within the density component 245*a*, an average absolute deviation may be taken of the sum of the grayscale values of the non-rotated stencil data 234*a*2-0, the half-rotated stencil data 234*a*2-180, the quarter-rotated stencil data 234*a*2-90 and the three-quarter rotated stencil data 234*a*270, and the results thereof may be provided to the 3-input B-transform as the third one of the three inputs thereto. The 3-input B-transform may implement either of the following calculations for each pixel 881 of the captured image 880*a***:

$$\text{per-pixel density} = \frac{(AAD\text{-non-rotated})(AAD\text{-half})}{(AAD\text{-total})^2}$$

$$\text{per-pixel density} = \frac{(AAD\text{-half})^2}{(AAD\text{-total})^2}$$

Again, as the 2D indicia stencil **886*a*2 is convolved about the pixels 881 of the captured image 880*a*, the 2-input B-transform generates a per-pixel density map 235*a***.

Turning to FIG. 5C, following the performance of the operations just described in connection with either of the embodiments of FIG. 5A or 5B, a filter component **246*a* may perform various operations on the resulting per-pixel density map 235*a* to generate the 2D indicia metadata 230*a*2. In so doing, the 2D indicia metadata 230*a*2 is caused to have a coarser granularity than the pixels 881 of the captured image 880*a* in which each value within the 2D indicia metadata 230*a*2 is associated with a tile of multiple ones of the pixel 881**.

More specifically, the filter component **246*a* may apply morphological closing with a square kernel of a pixel height and pixel width that may be specifiable within the configuration data 210*a*. This operation may merge the peaks among grayscale values in the per-pixel density map 235*a* that correspond to what may be corners of 2D indicia, while pruning peaks among grayscale values that correspond to corners that are not associated with 2D indicia. Next, the filter component 246*a* may apply a smoothing filter and then perform subsampling to reduce the overall quantity of values from the per-pixel quantity of values within the per-pixel density map 235*a* to a smaller per-tile quantity in which each tile corresponds to a square block of the pixels 881 of the captured image 880*a*, where the pixel height and pixel width of the tiles may be specifiable within the configuration data 210*a*. To complete the generation of the 2D indicia metadata 230*a*2, the filter component 246*a* may apply another morphological closing with another square kernel of a pixel height and pixel width that may be specifiable within the configuration data 210*a*** to impart a better shape to regions defined by the tiles where there may be 2D indicia, while filling in regions defined by the tiles that may not correspond to a corner of a 2D indicia. By way of example, such a kernel may be 3 pixels in height and in width.

Referring back to FIG. 3, at least the now generated 2D indicia metadata **230*a*2 may then be stored by the programmable logic device 250 within the storage 360 (as part of the metadata 230*a*) for retrieval by the processor 350. Again, depending on whether or not one or more other types of encoded data marking are also searched for and identified, the metadata 230 may also include metadata associated with such other types of encoded data marking (e.g., 1D indicia, etc.). As previously discussed, the processor 350 may employ such metadata in the performance of attempts at interpreting at least 2D indicia at the location(s) within the captured image 880*a* that are indicated by the metadata 230*a***.

Figure 6A:
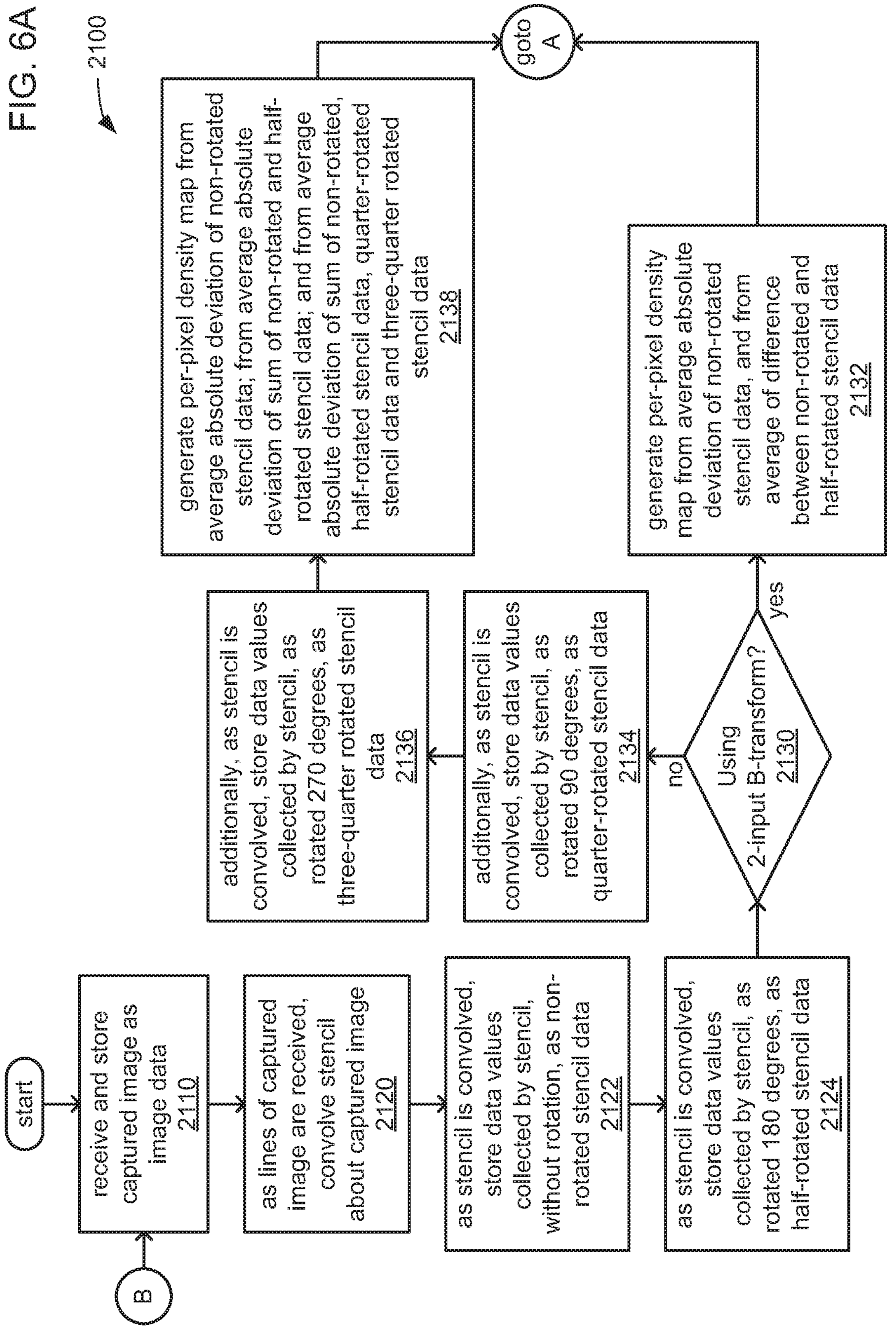
FIGS. 6A and 6B, together, show aspects of the operation of an implementation of the decoding system of either FIG. 1A or 1B.
Figure 6B:
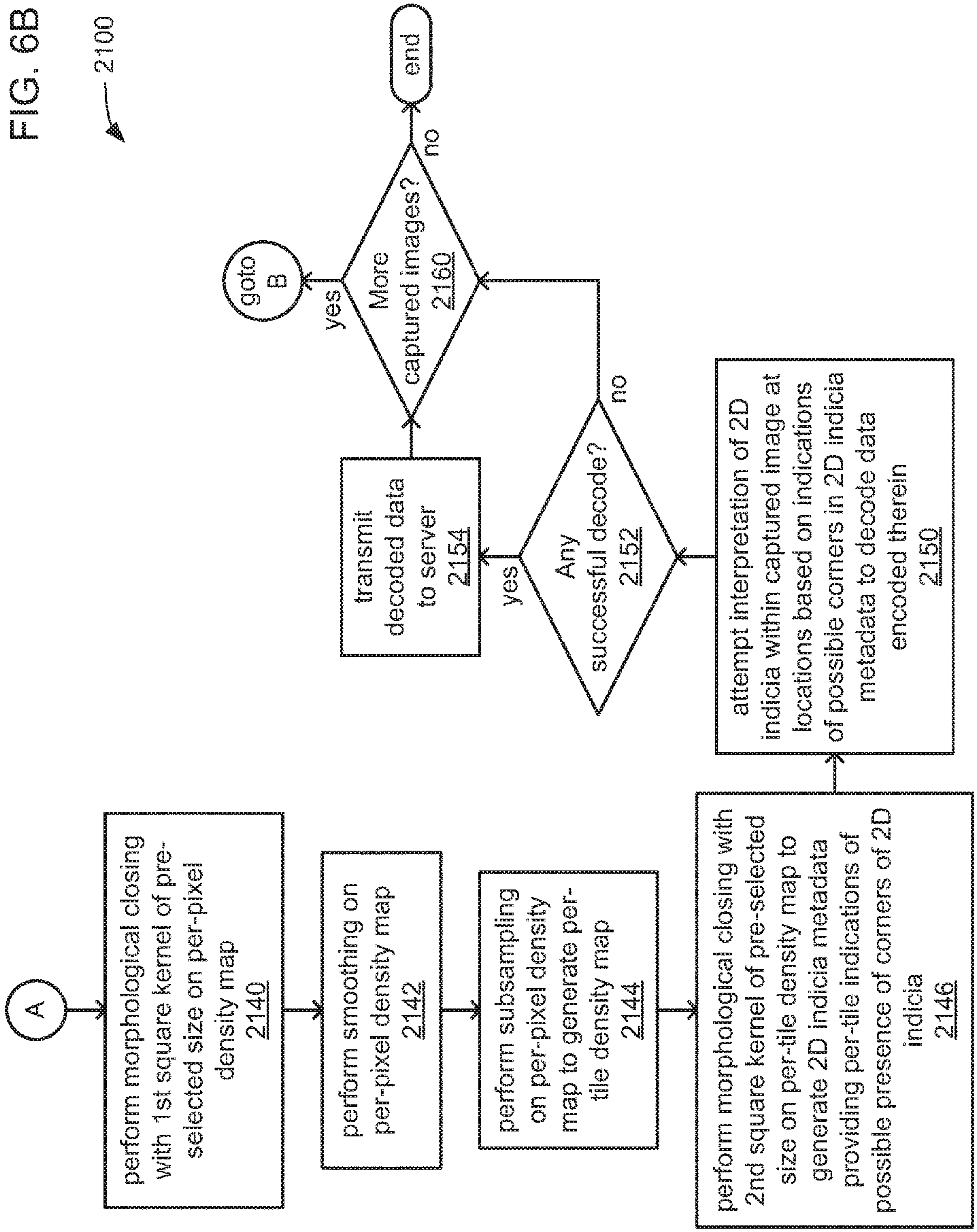

FIGS. 6A and 6B, together, provide a flowchart 2100 depicting aspects of operation of the decoding system 1000. More specifically, FIGS. 6A-B depict aspects of operations performed by at least the programmable logic device 250 and/or the processor 350 within at least one of the cameras **100*a*-*x* of the embodiment of FIG. 1A or within the decoding 400 of the embodiment of FIG. 1**B.

At 2110, programmable logic (e.g., the programmable logic device 250 within either one of the cameras **100*a*-*x* or within the decoding device 400) may receive and store an image captured by the image sensor of a camera of a decoding system as image data (e.g., receiving one of the captured images 800*a*-*z* as captured by one of the image sensors 110 of one of the cameras 100*a*-*x* of the decoding system 1000, and storing the captured image as one of image data 130*a*-*x***).

At 2120, as lines of the captured image are received, and in addition to storing the captured image as image data, the programmable logic may also buffer those lines and convolve a stencil about the pixels of those lines (e.g. convolving one of the stencils 886 about a buffered set of lines 882 of one of the captured images **880*a*-*x*). At 2122, as the stencil is convolved, the programmable logic may store data values of the pixels that fall under and are collected through the stencil, and without rotating the stencil, as non-rotated stencil data (e.g., the non-rotated stencil data 234*a*2-0**). At

2124, as the stencil is convolved, the programmable logic may also store data values of the pixels that fall under and are collected through the stencil with an organization that corresponds to rotating the stencil 180 degrees as half-rotated stencil data (e.g., the half-rotated stencil data 234*a*2-180).

At 2130, if a 2-input B-transform is to be used (e.g., the 2-input B-transform of FIG. 5A), then at 2132, the programmable logic may perform the 2-input B-transform to generate a per-pixel density map (e.g., the per-pixel density map 235*a*) from the average absolute deviation of the pixel data values of the non-rotated stencil data, and from the average of the difference between the pixel data values of the non-rotated stencil data and the half-rotated stencil data.

However, if at 2130, a 3-input B-transform is to be used (e.g., the 3-input B-transform of FIG. 5B), then at 2134, as the stencil is convolved, the programmable logic may also store data values of the pixels that fall under and are collected through the stencil with an organization that corresponds to rotating the stencil 90 degrees as quarter-rotated stencil data (e.g., the quarter-rotated stencil data 234*a*2-90). Also, as the stencil is convolved, the programmable logic may additionally store data values of the pixels that fall under and are collected through the stencil with an organization that corresponds to rotating the stencil 270 degrees as three-quarter rotated stencil data (e.g., the three-quarter rotated stencil data 234*a*2-270). The programmable logic may then perform the 3-input B-transform to generate the per-pixel density map from the average absolute deviation of the pixel data values of the non-rotated stencil data; from the average absolute deviation of the sum of the pixel data values of the non-rotated stencil data and the half-rotated stencil data; and from the sum of the pixel data values of the non-rotated stencil data, the half-rotated stencil data, the quarter-rotated stencil data and the three-quarter rotated stencil data.

At 2140, regardless of whether the per-pixel density map is generated at 2132 or 2138, the programmable logic may perform a first morphological closing with a first square kernel of pre-selected size on the per-pixel density map. At 2142, the programmable logic may then perform smoothing on the per-pixel density map. At 2144, the programmable logic may perform subsampling on the per-pixel density map to generate a per-tile density map (as a precursor to generating a per-tile 2D indicia metadata, such as the 2D indicia metadata 230*a*2). At 2146, the programmable logic may then perform a second morphological closing with a second square kernel of pre-selected size on the per-tile density map to complete the generation of the 2D indicia metadata, which provides a per-tile indication of possible locations of corners of 2D indicia.

At 2150, a processor (e.g., the processor 350 within either one of the cameras 100*a-x* or within the decoding device 400) may perform an attempt at interpretation of a 2D indicia at each location within the captured image that is indicated by the 2D indicia metadata to decode data that may be encoded within 2D indicia at those locations.

At 2152, a check may be made as to whether there has been any successful decode of encoded data from within a 2D indicia. If not, then a check may be made at 2160 of whether or not there are more captured images. However, if at 2152, there was at least one successful decode of encoded data, then at 2154, the processor may transmit the decoded data to another device via a network (e.g., to the server 900 via the network 999), before proceeding to check whether or not there are more captured images at 2160.

At 2160, if there are more captured images, then the programmable logic may receive another captured image at 2110.

Figure 7A:
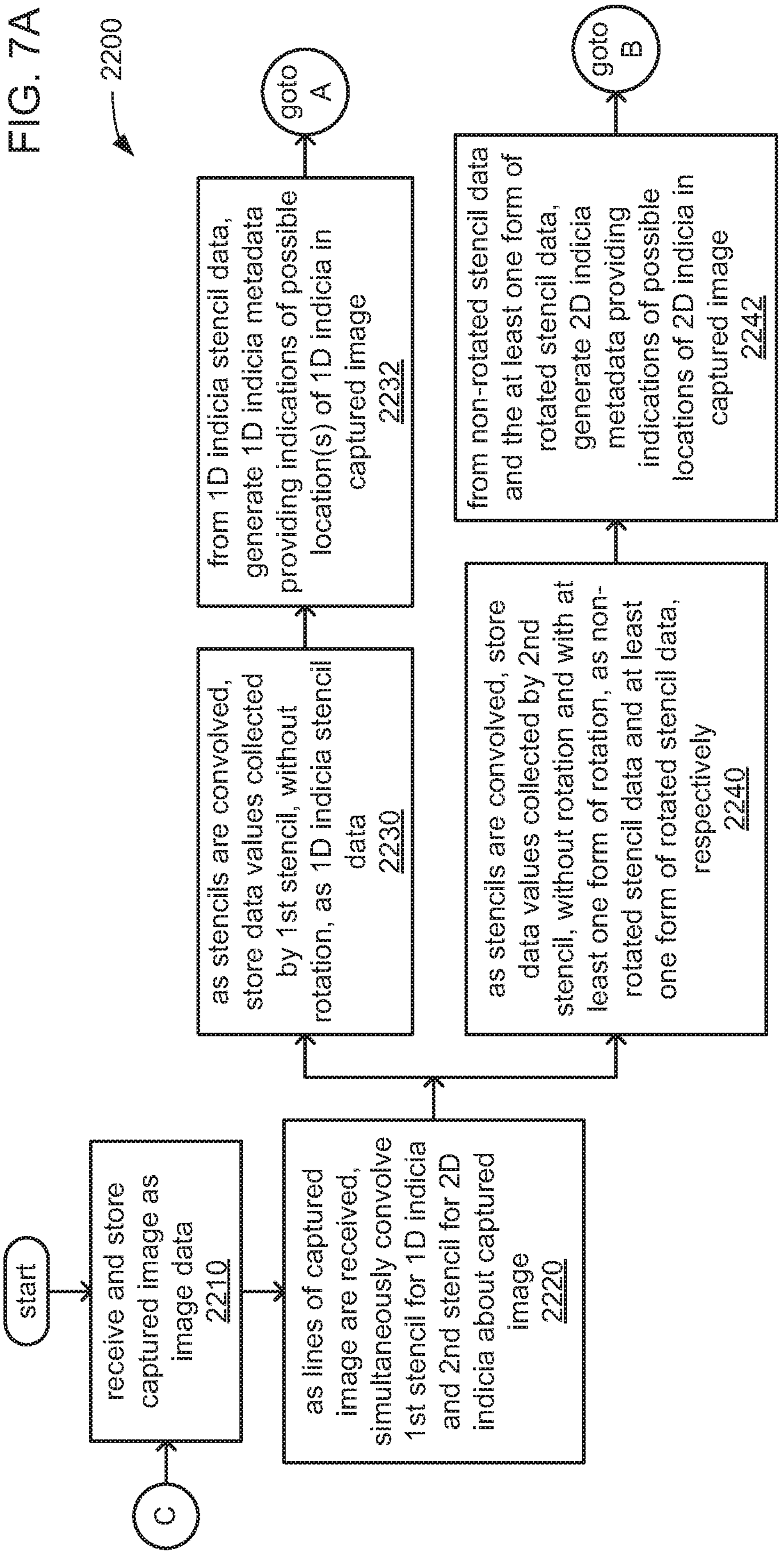
FIGS. 7A and 7B, together, show aspects of the operation of another implementation of the decoding system of either FIG. 1A or 1B.
Figure 7B:
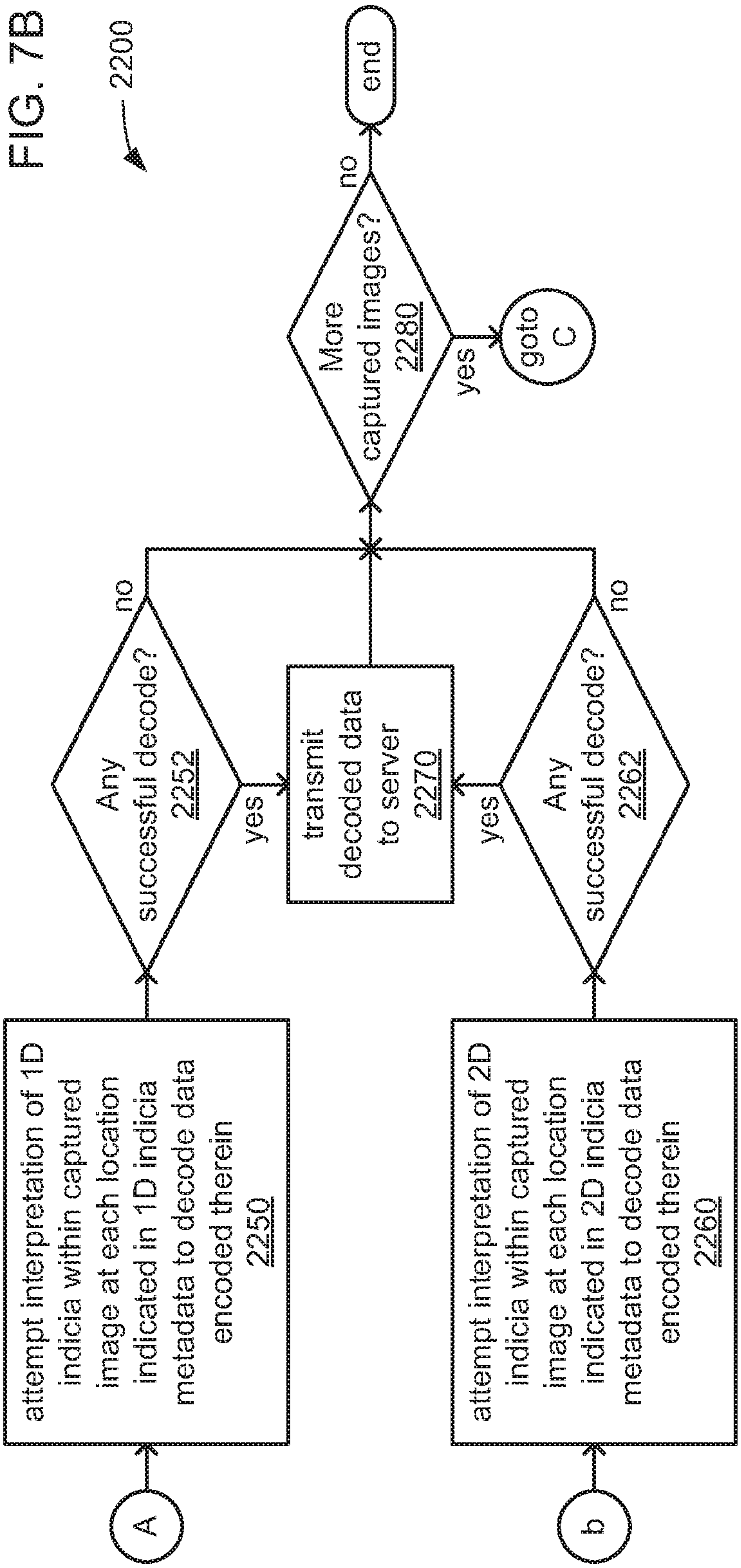

FIGS. 7A and 7B, together, provide a flowchart 2200 depicting aspects of operation of the decoding system 1000. More specifically, FIGS. 6A-B depict aspects of operations performed by at least the programmable logic device 250 and/or the processor 350 within at least one of the cameras 100*a-x* of the embodiment of FIG. 1A or within the decoding 400 of the embodiment of FIG. 1B.

At 2210, programmable logic (e.g., the programmable logic device 250 within either one of the cameras 100*a-x* or within the decoding device 400) may receive and store an image captured by the image sensor of a camera of a decoding system as image data (e.g., receiving one of the captured images 800*a-z* as captured by one of the image sensors 110 of one of the cameras 100*a-x* of the decoding system 1000, and storing the captured image as one of image data 130*a-x*).

At 2220, as lines of the captured image are received, and in addition to storing the captured image as image data, the programmable logic may also buffer those lines and simultaneously convolve both a 1D indicia stencil as part of searching for 1D indicia and a 2D indicia stencil as part of searching for 2D indicia about the pixels of those lines (e.g. convolving one of the stencils 886 about a buffered set of lines 882 of one of the captured images 880*a-x*).

At 2230, as both of the stencils are convolved, the programmable logic may store data values of the pixels that fall under and are collected through the 1D indicia stencil, and without rotating the 1D indicia stencil, as 1D indicia stencil data. At 2232, the programmable logic may then generate 1D indicia metadata therefrom that provides indications of possible location(s) of 1D indicia in the captured image (e.g., the 1D indicia metadata 230*a*1).

At 2240, and also as both of the stencils are convolved, the programmable logic may also store data values of the pixels that fall under and are collected through the 2D indicia stencil, both without rotating the 2D indicia stencil and with the 2D indicia stencil rotated at least once (e.g., with a half-turn), as non-rotated 2D indicia stencil data and at least one form of rotated 2D indicia stencil data (e.g., as non-rotated stencil data 234*a*2-0, and at least one of the other forms of stencil data 234*a*2-90, 234*a*2-180 and 234*a*2-270). At 2232, the programmable logic may then generate 2D indicia metadata therefrom that provides indications of possible location(s) of 2D indicia in the captured image (e.g., the 2D indicia metadata 230*a*2).

At 2250, a processor (e.g., the processor 350 within either one of the cameras 100*a-x* or within the decoding device 400) may perform an attempt at interpretation of a 1D indicia at each location within the captured image that is indicated by the 1D indicia metadata to decode data that may be encoded within 1D indicia at those locations. At 2260, a processor may also perform an attempt at interpretation of a 2D indicia at each location within the captured image that is indicated by the 2D indicia metadata to decode data that may be encoded within 2D indicia at those locations.

At 2252, a check may be made as to whether there has been any successful decode of encoded data from within a 1D indicia. Correspondingly, at 2262, a check may be made as to whether there has been any successful decode of encoded data from within a 2D indicia. If there has been no successful decode, at all at either 2252 or 2262, then a check may be made at 2280 of whether or not there are more captured images.

However, if at either of 2252 or 2262, there was at least one successful decode of encoded data, then at 2270, the processor may transmit the decoded data to another device via a network (e.g., to the server 900 via the network 999), before proceeding to check whether or not there are more captured images at 2280.

At 2280, if there are more captured images, then the programmable logic may receive another captured image at 2210.

There is thus disclosed a system to capture and decode encoded data.

An apparatus includes: a storage configured to store image data received from an image sensor of a camera of a captured image that is captured by the image sensor, wherein the captured image includes a two-dimensional (2D) array of pixels; and a programmable logic device coupled to the storage. The programmable logic device is configured to: convolve a 2D indicia stencil in a non-rotated orientation about the 2D array of pixels of the captured image to generate non-rotated stencil data; generate at least one rotated stencil data based on a rotation of the 2D indicia stencil out of the non-rotated orientation and into at least one rotated orientation; generate, based on the non-rotated stencil data and the at least one rotated stencil data, a per-pixel density map indicative of at least one location of at least one corner of at least one 2D indicia within the 2D array of pixels of the captured image; employ noise filtering and subsampling to generate, based on the per-pixel density map, a per-tile density map indicative of the at least one location of the at least one corner of the at least one 2D indicia within a 2D array of tiles that corresponds to the 2D array of pixels of the captured image; and generate, based on the per-tile density map, 2D indicia metadata indicative of the at least one location of the at least one 2D indicia within the captured image.

The programmable logic device may include a multi-line buffer. The programmable logic device may be configured to: receive the image data as a serial bit stream of data values of the pixels of the captured image as one horizontal line of pixels of the 2D array of pixels at a time; store the image data within the storage as the serial bit stream as horizontal lines of the pixels are received; store a predetermined quantity of most recently received ones of the horizontal lines of the pixels within the multi-line buffer; and convolve the 2D indicia stencil about a subset of the 2D array of pixels within the most recently received ones of the horizontal lines within the multi-line buffer as the horizontal lines of pixels are received.

The at least one rotated stencil data may include a half-rotated stencil data based on a 180-degree rotation of the 2D stencil out of the non-rotated orientation. The per-pixel density map may be generated by a performance of a 2-input B-transform based on inputs that include an average absolute deviation of the non-rotated stencil data and an average of a difference between the non-rotated stencil data and the half-rotated stencil data.

The at least one rotated stencil data may include: a half-rotated stencil data based on a 180-degree rotation of the 2D stencil out of the non-rotated orientation; a quarter-rotated stencil data based on a 90-degree rotation of the 2D stencil out of the non-rotated orientation; and a three-quarter rotated stencil data based on a 270-degree rotation of the 2D stencil out of the non-rotated orientation. The per-pixel density map may be generated by a performance of a 3-input B-transform based on inputs that include: an average absolute deviation of the non-rotated stencil data; an average absolute deviation of a sum of the non-rotated stencil data and the half-rotated stencil data; and an average absolute deviation of a sum of the non-rotated-stencil data, the half-rotated stencil data, the quarter-rotated stencil data and the three-quarter rotated stencil data.

The apparatus may include the camera.

The apparatus may include a processor coupled to the storage, and the processor may be configured to: perform a decoding of the at least one 2D indicia at the at least one location within the captured image as indicated in the 2D indicia metadata to attempt a decode of data encoded within the at least one 2D indicia; and in response to a successful decode of the data encoded within the at least one 2D indicia, transmit the data to a server via a network.

The programmable logic device may be configured to: convolve a 1D indicia stencil about the 2D array of pixels of the captured image simultaneously with the convolving of the 2D indicia stencil to generate 1D indicia stencil data; and generate, based on the 1D stencil data, 1D indicia metadata indicative of at least one other location of at least one 1D indicia within the captured image. The processor may be configured to: perform a decoding of the at least one 1D indicia at the at least one other location within the captured image as indicated in the 1D indicia metadata to attempt a decode of data encoded within the at least one 1D indicia; and in response to a successful decode of the data encoded within the at least one 1D indicia, transmit the data to the server via the network.

The at least one 2D indicia may be selected from a set consisting of a Datamatrix code, a QR code, and an Aztec code. The at least one 1D indicia may include a bar code.

A decoding system includes: multiple cameras, wherein at least one camera of the multiple cameras includes an image sensor configured to capture an image, wherein the captured image includes a two-dimensional (2D) array of pixels; and a programmable logic device. The programmable logic device is configured, for each captured image of the multiple captured images, to: convolve a 2D indicia stencil in a non-rotated orientation about the 2D array of pixels of the captured image to generate non-rotated stencil data; generate at least one rotated stencil data based on a rotation of the 2D indicia stencil out of the non-rotated orientation and into at least one rotated orientation; generate, based on the non-rotated stencil data and the at least one rotated stencil data, a per-pixel density map indicative of at least one location of at least one corner of at least one 2D indicia within the 2D array of pixels of the captured image; employ noise filtering and subsampling to generate, based on the per-pixel density map, a per-tile density map indicative of the at least one location of the at least one corner of the at least one 2D indicia within a 2D array of tiles that corresponds to the 2D array of pixels of the captured image; and generate, based on the per-tile density map, 2D indicia metadata indicative of the at least one location of the at least one 2D indicia within the captured image.

The programmable logic device may include a multi-line buffer. The programmable logic device may be configured, for each captured image, to: receive the image data as a serial bit stream of data values of the pixels of the captured image as one horizontal line of pixels of the 2D array of pixels at a time; store a predetermined quantity of most recently received ones of the horizontal lines of the pixels within the multi-line buffer; and convolve the 2D indicia stencil about a subset of the 2D array of pixels within the most recently received ones of the horizontal lines within the multi-line buffer as the horizontal lines of pixels are received.

For each captured image: the at least one rotated stencil data may include a half-rotated stencil data based on a 180-degree rotation of the 2D stencil out of the non-rotated orientation. The per-pixel density map may be generated by a performance of a 2-input B-transform based on inputs that include an average absolute deviation of the non-rotated stencil data and an average of a difference between the non-rotated stencil data and the half-rotated stencil data.

The at least one rotated stencil data may include: a half-rotated stencil data based on a 180-degree rotation of the 2D stencil out of the non-rotated orientation; a quarter-rotated stencil data based on a 90-degree rotation of the 2D stencil out of the non-rotated orientation; and a three-quarter rotated stencil data based on a 270-degree rotation of the 2D stencil out of the non-rotated orientation. The per-pixel density map may be generated by a performance of a 3-input B-transform based on inputs that include: an average absolute deviation of the non-rotated stencil data; an average absolute deviation of a sum of the non-rotated stencil data and the half-rotated stencil data; and an average absolute deviation of a sum of the non-rotated-stencil data, the half-rotated stencil data, the quarter-rotated stencil data and the three-quarter rotated stencil data.

The at least one camera of the multiple cameras further may include: the programmable logic device; a storage coupled to the programmable logic device, the storage configured to store image data representing the captured image or the 2D indicia metadata; and a processor coupled to the storage. The processor may be configured to: perform a decoding of the at least one 2D indicia at the at least one location within the captured image as indicated in the 2D indicia metadata to attempt a decode of data encoded within the at least one 2D indicia; and in response to a successful decode of the data encoded within the at least one 2D indicia, transmit the data to a server via a network.

The decoding system may further include a decoding device that may include: the programmable logic device; a storage coupled to the programmable logic device, the storage configured to store image data representing the captured image or the 2D indicia metadata; and a processor coupled to the storage. The processor may be configured to: perform a decoding of the at least one 2D indicia at the at least one location within the captured image as indicated in the 2D indicia metadata to attempt a decode of data encoded within the at least one 2D indicia; and in response to a successful decode of the data encoded within the at least one 2D indicia, transmit the data to a server via a network.

A method includes: receiving, at a programmable logic device, image data from an image sensor of a camera of a captured image captured by the image sensor, wherein the captured image includes a two-dimensional (2D) array of pixels; convolving, by the programmable logic device, a 2D indicia stencil in a non-rotated orientation about the 2D array of pixels of the captured image to generate non-rotated stencil data; generating, by the programmable logic device, at least one rotated stencil data based on a rotation of the 2D indicia stencil out of the non-rotated orientation and into at least one rotated orientation; generating, at the programmable logic device, and based on the non-rotated stencil data and the at least one rotated stencil data, a per-pixel density map indicative of at least one location of at least one corner of at least one 2D indicia within the 2D array of pixels of the captured image; employing noise filtering and subsampling to generate, by the programmable logic device, and based on the per-pixel density map, a per-tile density map indicative of the at least one location of the at least one corner of the at least one 2D indicia within a 2D array of tiles that corresponds to the 2D array of pixels of the captured image; and generating, by the programmable logic device, and based on the per-tile density map, 2D indicia metadata indicative of the at least one location of the at least one 2D indicia within the captured image.

The programmable logic device may include a multi-line buffer. The method may further include: receiving the image data as a serial bit stream of data values of the pixels of the captured image as one horizontal line of pixels of the 2D array of pixels at a time; storing a predetermined quantity of most recently received ones of the horizontal lines of the pixels within the multi-line buffer; and convolving the 2D indicia stencil about a subset of the 2D array of pixels within the most recently received ones of the horizontal lines within the multi-line buffer as the horizontal lines of pixels are received.

The at least one rotated stencil data may include a half-rotated stencil data based on a 180-degree rotation of the 2D stencil out of the non-rotated orientation. Generating the per-pixel density map may include performing a 2-input B-transform based on inputs that include an average absolute deviation of the non-rotated stencil data and an average of a difference between the non-rotated stencil data and the half-rotated stencil data.

The at least one rotated stencil data may include: a half-rotated stencil data based on a 180-degree rotation of the 2D stencil out of the non-rotated orientation; a quarter-rotated stencil data based on a 90-degree rotation of the 2D stencil out of the non-rotated orientation; and a three-quarter rotated stencil data based on a 270-degree rotation of the 2D stencil out of the non-rotated orientation. Generating the per-pixel density map may include performing a 3-input B-transform based on inputs that include: an average absolute deviation of the non-rotated stencil data; an average absolute deviation of a sum of the non-rotated stencil data and the half-rotated stencil data; and an average absolute deviation of a sum of the non-rotated-stencil data, the half-rotated stencil data, the quarter-rotated stencil data and the three-quarter rotated stencil data.

The method may further include: performing, by a processor, a decoding of the at least one 2D indicia at the at least one location within the captured image as indicated in the 2D indicia metadata to attempt a decode of data encoded within the at least one 2D indicia; and in response to a successful decode of the data encoded within the at least one 2D indicia, transmitting, by the processor, the data to a server via a network.

The method may include: convolving, by the programmable logic device, a 1D indicia stencil about the 2D array of pixels of the captured image simultaneously with the convolving of the 2D indicia stencil to generate 1D indicia stencil data; generating, by the programmable logic device, and based on the 1D stencil data, 1D indicia metadata indicative of at least one other location of at least one 1D indicia within the captured image; performing, by the processor, a decoding of the at least one 1D indicia at the at least one other location within the captured image as indicated in the 1D indicia metadata to attempt a decode of data encoded within the at least one 1D indicia; and in response to a successful decode of the data encoded within the at least one 1D indicia, transmitting, by the processor, the data to the server via the network.

The invention claimed is:

1. An apparatus comprising:

storage configured to store image data received from an image sensor of a camera of a captured image that is captured by the image sensor, wherein the captured image comprises a two-dimensional (2D) array of pixels; and a programmable logic device coupled to the storage, the programmable logic device configured to:

convolve a 2D indicia stencil in a non-rotated orientation about the 2D array of pixels of the captured image to generate non-rotated stencil data;

generate at least one rotated stencil data based on a rotation of the 2D indicia stencil out of the non-rotated orientation and into at least one rotated orientation;

generate, based on the non-rotated stencil data and the at least one rotated stencil data, a per-pixel density map indicative of at least one location of at least one corner of at least one 2D indicia within the 2D array of pixels of the captured image;

employ noise filtering and subsampling to generate, based on the per-pixel density map, a per-tile density map indicative of the at least one location of the at least one corner of the at least one 2D indicia within a 2D array of tiles that corresponds to the 2D array of pixels of the captured image; and generate, based on the per-tile density map, 2D indicia metadata indicative of the at least one location of the at least one 2D indicia within the captured image.

2. The apparatus of claim 1, wherein:

the programmable logic device comprises a multi-line buffer; and the programmable logic device is configured to:

receive the image data as a serial bit stream of data values of the pixels of the captured image as one horizontal line of pixels of the 2D array of pixels at a time;

store the image data within the storage as the serial bit stream as horizontal lines of the pixels are received;

store a predetermined quantity of most recently received ones of the horizontal lines of the pixels within the multi-line buffer; and convolve the 2D indicia stencil about a subset of the 2D array of pixels within the most recently received ones of the horizontal lines within the multi-line buffer as the horizontal lines of pixels are received.

3. The apparatus of claim 1, wherein:

the at least one rotated stencil data comprises a half-rotated stencil data based on a 180-degree rotation of the 2D stencil out of the non-rotated orientation; and the per-pixel density map is generated by a performance of a 2-input B-transform based on inputs comprising an average absolute deviation of the non-rotated stencil data and an average of a difference between the non-rotated stencil data and the half-rotated stencil data.

4. The apparatus of claim 1, wherein:

the at least one rotated stencil data comprises:

a half-rotated stencil data based on a 180-degree rotation of the 2D stencil out of the non-rotated orientation;

a quarter-rotated stencil data based on a 90-degree rotation of the 2D stencil out of the non-rotated orientation; and a three-quarter rotated stencil data based on a 270-degree rotation of the 2D stencil out of the non-rotated orientation; and the per-pixel density map is generated by a performance of a 3-input B-transform based on inputs comprising:

an average absolute deviation of the non-rotated stencil data;

an average absolute deviation of a sum of the non-rotated stencil data and the half-rotated stencil data; and an average absolute deviation of a sum of the non-rotated-stencil data, the half-rotated stencil data, the quarter-rotated stencil data and the three-quarter rotated stencil data.

5. The apparatus of claim 1, comprising the camera.

6. The apparatus of claim 1, further comprising a processor coupled to the storage, the processor configured to:

perform a decoding of the at least one 2D indicia at the at least one location within the captured image as indicated in the 2D indicia metadata to attempt a decode of data encoded within the at least one 2D indicia; and in response to a successful decode of the data encoded within the at least one 2D indicia, transmit the data to a server via a network.

7. The apparatus of claim 6, wherein:

the programmable logic device is configured to:

convolve a 1D indicia stencil about the 2D array of pixels of the captured image simultaneously with the convolving of the 2D indicia stencil to generate 1D indicia stencil data; and generate, based on the 1D stencil data, 1D indicia metadata indicative of at least one other location of at least one 1D indicia within the captured image; and the processor is configured to:

perform a decoding of the at least one 1D indicia at the at least one other location within the captured image as indicated in the 1D indicia metadata to attempt a decode of data encoded within the at least one 1D indicia; and in response to a successful decode of the data encoded within the at least one 1D indicia, transmit the data to the server via the network.

8. The apparatus of claim 7, wherein:

the at least one 2D indicia is selected from a set consisting of a Datamatrix code, a QR code, and an Aztec code; and the at least one 1D indicia comprises a bar code.

9. A decoding system comprising:

multiple cameras, wherein at least one camera of the multiple cameras comprises an image sensor configured to capture an image, wherein the captured image comprises a two-dimensional (2D) array of pixels; and a programmable logic device configured, for each captured image of the multiple captured images, to:

convolve a 2D indicia stencil in a non-rotated orientation about the 2D array of pixels of the captured image to generate non-rotated stencil data;

generate at least one rotated stencil data based on a rotation of the 2D indicia stencil out of the non-rotated orientation and into at least one rotated orientation;

generate, based on the non-rotated stencil data and the at least one rotated stencil data, a per-pixel density map indicative of at least one location of at least one corner of at least one 2D indicia within the 2D array of pixels of the captured image;

employ noise filtering and subsampling to generate, based on the per-pixel density map, a per-tile density map indicative of the at least one location of the at least one corner of the at least one 2D indicia within a 2D array of tiles that corresponds to the 2D array of pixels of the captured image; and generate, based on the per-tile density map, 2D indicia metadata indicative of the at least one location of the at least one 2D indicia within the captured image.

10. The decoding system of claim 9, wherein:

the programmable logic device comprises a multi-line buffer; and the programmable logic device is configured, for each captured image, to:

receive the image data as a serial bit stream of data values of the pixels of the captured image as one horizontal line of pixels of the 2D array of pixels at a time;

store a predetermined quantity of most recently received ones of the horizontal lines of the pixels within the multi-line buffer; and convolve the 2D indicia stencil about a subset of the 2D array of pixels within the most recently received ones of the horizontal lines within the multi-line buffer as the horizontal lines of pixels are received.

11. The decoding system of claim 9, wherein, for each captured image:

the at least one rotated stencil data comprises a half-rotated stencil data based on a 180-degree rotation of the 2D stencil out of the non-rotated orientation; and the per-pixel density map is generated by a performance of a 2-input B-transform based on inputs comprising an average absolute deviation of the non-rotated stencil data and an average of a difference between the non-rotated stencil data and the half-rotated stencil data.

12. The decoding system of claim 9, wherein:

the at least one rotated stencil data comprises:

a half-rotated stencil data based on a 180-degree rotation of the 2D stencil out of the non-rotated orientation;

a quarter-rotated stencil data based on a 90-degree rotation of the 2D stencil out of the non-rotated orientation; and a three-quarter rotated stencil data based on a 270-degree rotation of the 2D stencil out of the non-rotated orientation; and the per-pixel density map is generated by a performance of a 3-input B-transform based on inputs comprising:

an average absolute deviation of the non-rotated stencil data;

an average absolute deviation of a sum of the non-rotated stencil data and the half-rotated stencil data; and an average absolute deviation of a sum of the non-rotated-stencil data, the half-rotated stencil data, the quarter-rotated stencil data and the three-quarter rotated stencil data.

13. The decoding system of claim 9, wherein the at least one camera of the multiple cameras further comprises:

the programmable logic device;

a storage coupled to the programmable logic device, the storage configured to store image data representing the captured image or the 2D indicia metadata; and a processor coupled to the storage, the processor configured to:

perform a decoding of the at least one 2D indicia at the at least one location within the captured image as indicated in the 2D indicia metadata to attempt a decode of data encoded within the at least one 2D indicia; and in response to a successful decode of the data encoded within the at least one 2D indicia, transmit the data to a server via a network.

14. The decoding system of claim 9, further comprising a decoding device, wherein the decoding device comprises:

the programmable logic device;

a storage coupled to the programmable logic device, the storage configured to store image data representing the captured image or the 2D indicia metadata; and a processor coupled to the storage, the processor configured to:

perform a decoding of the at least one 2D indicia at the at least one location within the captured image as indicated in the 2D indicia metadata to attempt a decode of data encoded within the at least one 2D indicia; and in response to a successful decode of the data encoded within the at least one 2D indicia, transmit the data to a server via a network.

15. A method comprising:

receiving, at a programmable logic device, image data from an image sensor of a camera of a captured image captured by the image sensor, wherein the captured image comprises a two-dimensional (2D) array of pixels;

convolving, by the programmable logic device, a 2D indicia stencil in a non-rotated orientation about the 2D array of pixels of the captured image to generate non-rotated stencil data;

generating, by the programmable logic device, at least one rotated stencil data based on a rotation of the 2D indicia stencil out of the non-rotated orientation and into at least one rotated orientation;

generating, at the programmable logic device, and based on the non-rotated stencil data and the at least one rotated stencil data, a per-pixel density map indicative of at least one location of at least one corner of at least one 2D indicia within the 2D array of pixels of the captured image;

employing noise filtering and subsampling to generate, by the programmable logic device, and based on the per-pixel density map, a per-tile density map indicative of the at least one location of the at least one corner of the at least one 2D indicia within a 2D array of tiles that corresponds to the 2D array of pixels of the captured image; and generating, by the programmable logic device, and based on the per-tile density map, 2D indicia metadata indicative of the at least one location of the at least one 2D indicia within the captured image.

16. The method of claim 15, wherein:

the programmable logic device comprises a multi-line buffer; and the method further comprises:

receiving the image data as a serial bit stream of data values of the pixels of the captured image as one horizontal line of pixels of the 2D array of pixels at a time;

storing a predetermined quantity of most recently received ones of the horizontal lines of the pixels within the multi-line buffer; and convolving the 2D indicia stencil about a subset of the 2D array of pixels within the most recently received ones of the horizontal lines within the multi-line buffer as the horizontal lines of pixels are received.

17. The method of claim 15, wherein:

the at least one rotated stencil data comprises a half-rotated stencil data based on a 180-degree rotation of the 2D stencil out of the non-rotated orientation; and generating the per-pixel density map comprises performing a 2-input B-transform based on inputs comprising an average absolute deviation of the non-rotated stencil data and an average of a difference between the non-rotated stencil data and the half-rotated stencil data.

18. The method of claim 15, wherein:

the at least one rotated stencil data comprises:

a half-rotated stencil data based on a 180-degree rotation of the 2D stencil out of the non-rotated orientation;

a quarter-rotated stencil data based on a 90-degree rotation of the 2D stencil out of the non-rotated orientation; and a three-quarter rotated stencil data based on a 270-degree rotation of the 2D stencil out of the non-rotated orientation; and generating the per-pixel density map comprises performing a 3-input B-transform based on inputs comprising:

an average absolute deviation of the non-rotated stencil data;

an average absolute deviation of a sum of the non-rotated stencil data and the half-rotated stencil data; and an average absolute deviation of a sum of the non-rotated-stencil data, the half-rotated stencil data, the quarter-rotated stencil data and the three-quarter rotated stencil data.

19. The method of claim 15, further comprising:

performing, by a processor, a decoding of the at least one 2D indicia at the at least one location within the captured image as indicated in the 2D indicia metadata to attempt a decode of data encoded within the at least one 2D indicia; and in response to a successful decode of the data encoded within the at least one 2D indicia, transmitting, by the processor, the data to a server via a network.

20. The method of claim 19, comprising:

convolving, by the programmable logic device, a 1D indicia stencil about the 2D array of pixels of the captured image simultaneously with the convolving of the 2D indicia stencil to generate 1D indicia stencil data;

generating, by the programmable logic device, and based on the 1D stencil data, 1D indicia metadata indicative of at least one other location of at least one 1D indicia within the captured image;

performing, by the processor, a decoding of the at least one 1D indicia at the at least one other location within the captured image as indicated in the 1D indicia metadata to attempt a decode of data encoded within the at least one 1D indicia; and in response to a successful decode of the data encoded within the at least one 1D indicia, transmitting, by the processor, the data to the server via the network.

* * * * *